United States Patent
Kimoto

(10) Patent No.: US 8,958,006 B2
(45) Date of Patent: Feb. 17, 2015

(54) IMAGE PICKUP APPARATUS CAPABLE OF PERFORMING FOCUS CONTROL DURING A CONTINUOUS SHOOTING INTERVAL

(75) Inventor: Satoshi Kimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1020 days.

(21) Appl. No.: 11/672,366

(22) Filed: Feb. 7, 2007

(65) Prior Publication Data

US 2007/0195189 A1    Aug. 23, 2007

(30) Foreign Application Priority Data

Feb. 20, 2006  (JP) ................. 2006-042449

(51) Int. Cl.
*G03B 13/00* (2006.01)
*H04N 5/232* (2006.01)
*G03B 13/34* (2006.01)

(52) U.S. Cl.
CPC ..................................... *G03B 13/34* (2013.01)
USPC ....................................................... 348/345

(58) Field of Classification Search
USPC ............... 348/220.1, 345–346, 349, 351, 353
See application file for complete search history.

(56) References Cited

U.S. PATENT DOCUMENTS

| | | | |
|---|---|---|---|
| 6,727,949 B1 * | 4/2004 | Saruwatari et al. | 348/349 |
| 7,280,147 B2 * | 10/2007 | Kitajima et al. | 348/345 |
| 7,602,436 B2 * | 10/2009 | Kikuchi | 348/345 |
| 7,626,613 B2 * | 12/2009 | Kawamura | 348/220.1 |
| 7,692,690 B2 * | 4/2010 | Honma | 348/220.1 |
| 7,991,265 B2 * | 8/2011 | Kaku | 386/225 |
| 2003/0160874 A1 * | 8/2003 | Kuroiwa | 348/220.1 |
| 2004/0155976 A1 * | 8/2004 | Suda | 348/345 |
| 2004/0263674 A1 * | 12/2004 | Koreki | 348/345 |
| 2005/0104993 A1 * | 5/2005 | Matsumoto | 348/345 |
| 2005/0275742 A1 * | 12/2005 | Baron | 348/345 |
| 2005/0275743 A1 * | 12/2005 | Kikuchi | 348/345 |
| 2006/0044453 A1 * | 3/2006 | Lee | 348/345 |
| 2006/0239654 A1 * | 10/2006 | Kawamura | 386/107 |
| 2008/0143865 A1 * | 6/2008 | Kimoto | 348/345 |

FOREIGN PATENT DOCUMENTS

| | | |
|---|---|---|
| JP | 2001-255456 A | 9/2001 |
| JP | 2002-116375 A | 4/2002 |
| JP | 2002-320119 A | 10/2002 |
| JP | 2005-037898 A | 2/2005 |

OTHER PUBLICATIONS

JP 2001-255456 A (Machine English Translation; Japanese version submitted on IDS Feb. 7, 2007).*

* cited by examiner

*Primary Examiner* — Twyler Haskins
*Assistant Examiner* — Carramah J Quiett
(74) *Attorney, Agent, or Firm* — Canon USA, Inc., IP Division

(57) ABSTRACT

An image pickup apparatus performs focus control by a contrast detection method during a continuous shooting interval. After the image pickup apparatus controls the movement of the focus lens and captures an image for recording in the continuous shooting mode, the image pickup apparatus controls the movement of the focus lens before capturing the subsequent image for recording concurrently with performance of a development process of the captured image.

21 Claims, 20 Drawing Sheets

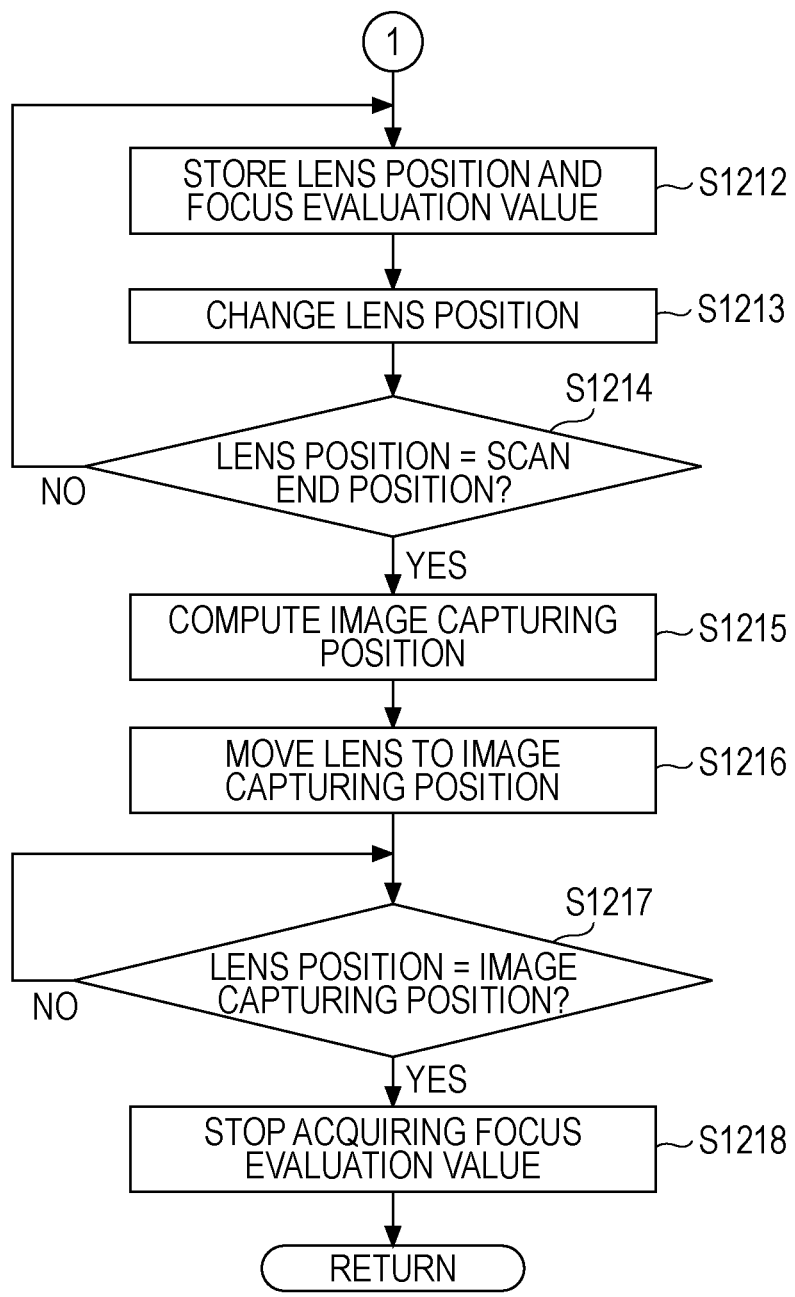

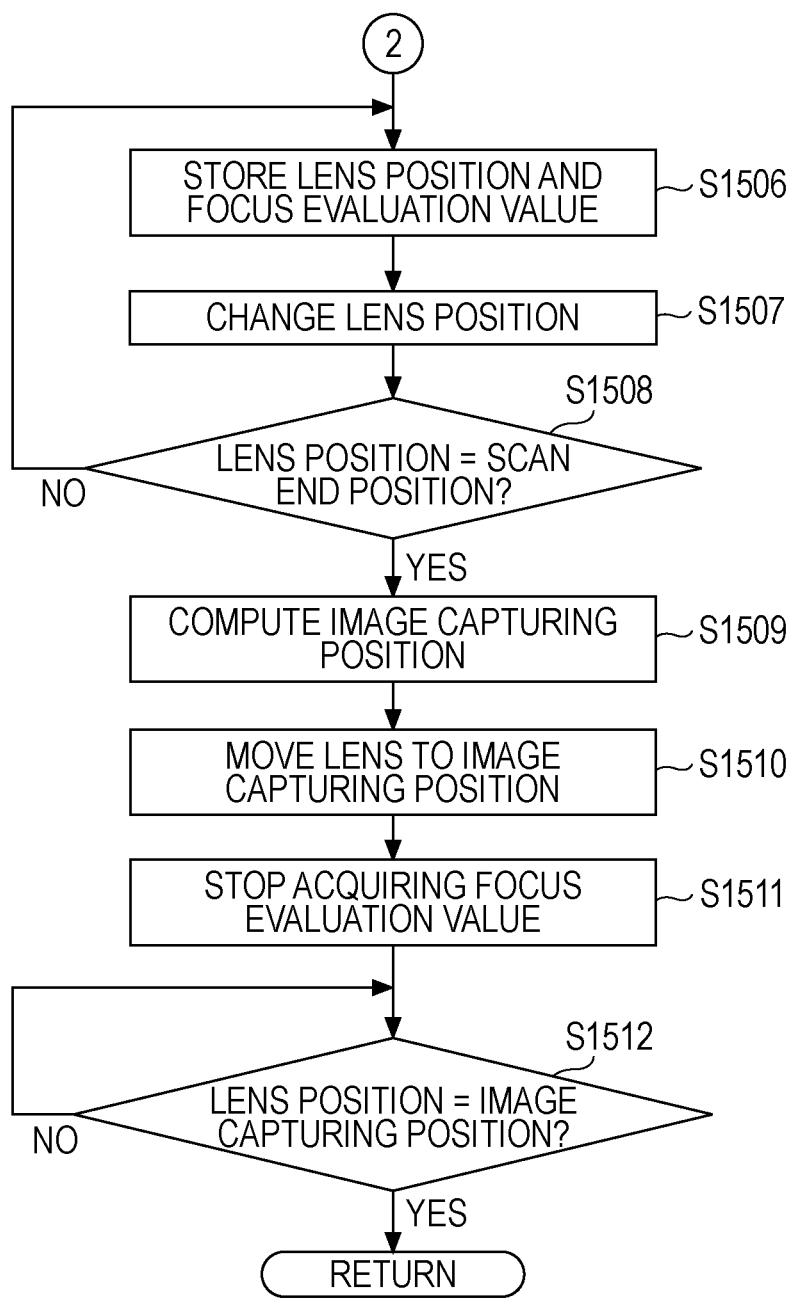

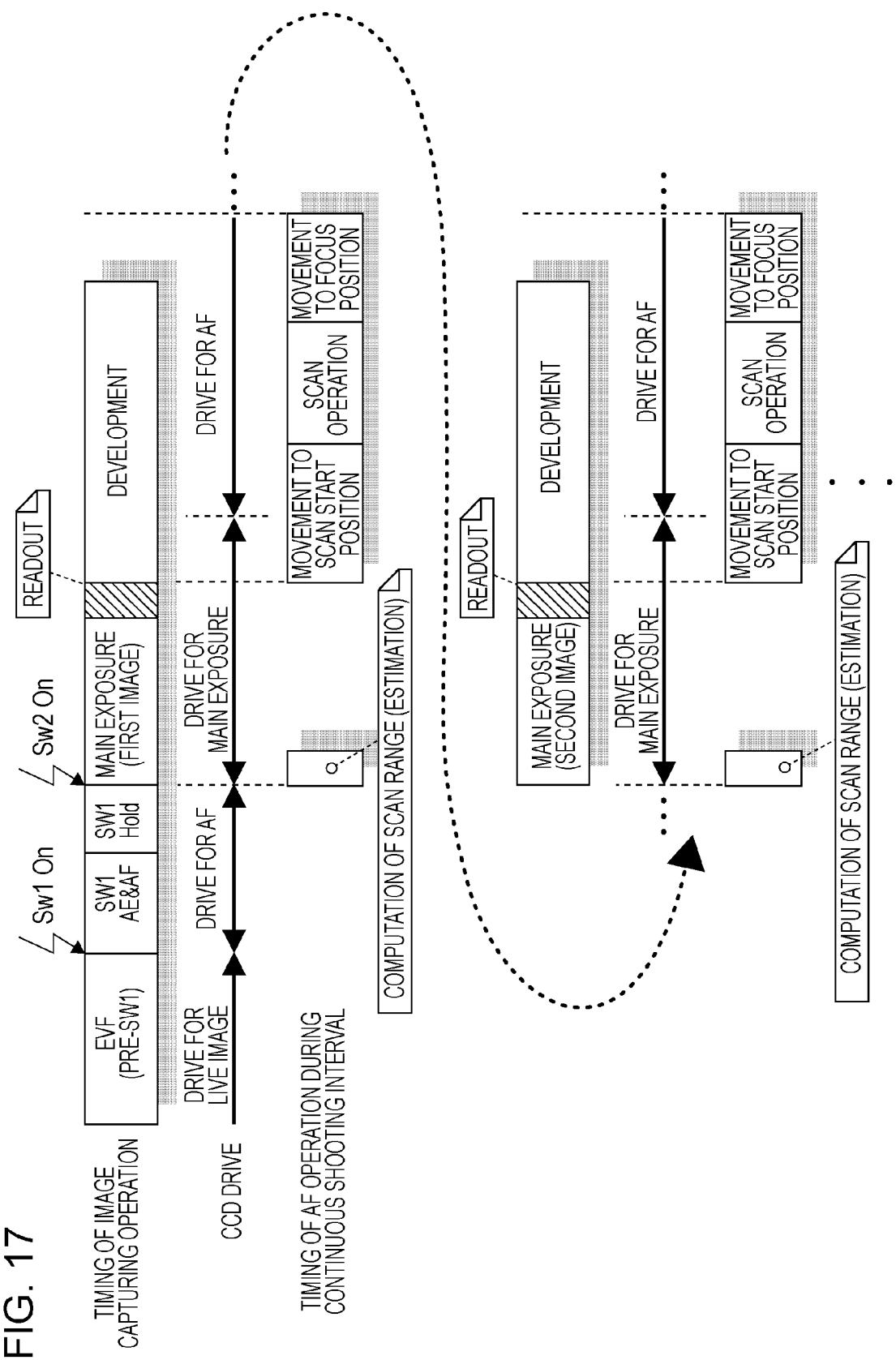

IMAGE PICKUP APPARATUS CAPABLE OF PERFORMING FOCUS CONTROL DURING A CONTINUOUS SHOOTING INTERVAL

BACKGROUND OF THE INVENTION

1. Field of the Invention

The present invention relates to an image pickup apparatus capable of performing focus control during a continuous shooting interval.

2. Description of the Related Art

A focus control apparatus used in electronic cameras is known that performs focus control by a contrast detection auto focus method. In the contrast detection auto focus method, the focus control apparatus determines the lens position that maximizes the high-frequency component of a luminance signal of a subject image formed on an image pickup device to be a focused focal point. Hereinafter, the high-frequency component is referred to as a "focus evaluation value".

In addition, a focus control apparatus is known that performs focus control on the basis of a passive and active auto focus (AF). In the passive and active AF, the focus control apparatus receives a light beam reflected off a subject using a lens other than the imaging-capturing lens and a dedicated sensor. In addition, some focus control apparatuses employ the two above-described techniques and selects one of the two techniques as needed.

In recent years, many electronic cameras have employed the contrast detection auto focus method for a focus control apparatus. However, unlike a method of using a dedicated AF sensor, this method requires a scan operation of a focus lens in a light axis direction thereof, and therefore, additional time is generally required before focusing is achieved. Accordingly, in a mode that needs to reduce the shooting lag (such as in a continuous shooting mode), focus control is performed only once before starting the continuous shooting. In the subsequent continuous shooting operation, focus control is not performed. As such, Japanese Patent Laid-Open No. 2001-255456 describes a technique of reducing the increase in the time lag by switching between a focus control apparatus based on the contrast detection method and a focus control apparatus based on the passive/active AF using a dedicated sensor.

However, if an electronic camera includes a dedicated sensor for realizing the passive or active AF in addition to the focus control apparatus based on the contrast detection method, the body size and the fabrication cost of the electronic camera are increased. Therefore, it is difficult to apply this technology to all the electronic cameras.

The known technology for using a focus control apparatus based on the contrast detection method has the following disadvantages. For example, if the focus is locked at the focus lens position for the first image capturing operation in a continuous shooting mode and a subject moves beyond the depth of field during a continuous shooting operation, all the subsequent captured images are out of focus. In contrast, if the focus is adjusted by the contrast detection method every time an image is captured during a continuous shooting operation, the time interval between the image capturing operations is increased.

SUMMARY OF THE INVENTION

The present invention provides an image pickup technology for significantly reducing a continuous shooting interval time and realizing focus control by the contrast detection method during the continuous shooting interval time.

According to an embodiment of the present invention, an image pickup apparatus is provided having a continuous shooting mode in which a plurality of images are captured for recording in response to an image capture instruction. The image pickup apparatus includes a focus control unit configured to detect a focal point of a focus lens by scanning the focus lens in a light axis direction thereof and controlling movement of the focus lens so that the focus lens is focused at the focal point; and a control unit configured to control movement of the focus lens and to control the capturing of an image. After the control unit controls the movement of the focus lens using the focus control unit and captures an image for recording in the continuous shooting mode, the control unit controls the movement of the focus lens using the focus control unit before capturing the subsequent image for recording concurrently with performance of a development process of the captured image.

According to another aspect of the present invention, the control of the movement of the focus lens for the subsequent image capturing operation for recording by the focus control unit is performed concurrently with a readout process of an exposure image from an image pickup device.

According to yet another aspect of the present invention, the control of the movement of the focus lens for the subsequent image capturing operation for recording by the focus control unit includes controlling the movement of the focus lens to a scan start position for detecting the focused focal point.

Moreover, according to another aspect of the present invention, in the continuous shooting mode, a position from which detection of the focal point is performed by the focus control unit is determined on the basis of the position of the focal point detected during capturing of the previous image.

Additionally, according to another aspect of the present invention, an image pickup apparatus is provided having a continuous shooting mode in which a plurality of images are captured for recording in response to an image capture instruction. The image pickup apparatus includes a focus control unit configured to detect a focal point of a focus lens by scanning the focus lens in a light axis direction thereof and controlling movement of the focus lens so that the focus lens is focused at the focal point; a memory configured to temporarily store the captured images; an instructing unit configured to instruct a monitor to output the images without recording the images stored in the memory; and a control unit configured to control movement of the focus lens and to control the capturing of an image. After the control unit controls the movement of the focus lens using the focus control unit and captures an image for recording in the continuous shooting mode, the control unit controls the movement of the focus lens using the focus control unit before the instruction unit instructs the monitor to output one of the images.

According to yet another aspect of the present invention, in the continuous shooting mode, a position from which detection of the focal point is performed by the focus control unit is determined on the basis of the position of the focal point detected during capturing of the previous image.

Furthermore, according to yet another aspect of the present invention, a method is provided which may be utilized in an image pickup apparatus having a continuous shooting mode in which a plurality of images are captured for recording in response to an image capture instruction, the image pickup apparatus including a focus control unit configured to detect a focal point of a focus lens by scanning the focus lens in a light axis direction thereof and controlling movement of the focus lens so that the focus lens is focused at the focal point; and a control unit configured to control movement of the focus lens and to control the capturing of an image. The method includes controlling the movement of the focus lens; capturing an image for recording in the continuous shooting mode; and controlling the movement of the focus lens before capturing a subsequent image for recording concurrently with performance of a development process of the captured image.

And furthermore, according to another aspect of the present invention, a computer readable medium is provided containing computer-executable instructions for controlling an image pickup apparatus having a continuous shooting mode in which a plurality of images are captured for recording in response to an image capture instruction, the image pickup apparatus including a focus control unit configured to detect a focal point of a focus lens by scanning the focus lens in a light axis direction thereof and controlling movement of the focus lens so that the focus lens is focused at the focal point; and a control unit configured to control movement of the focus lens and to control the capturing of an image. The computer readable medium includes computer-executable instructions for controlling the movement of the focus lens; computer-executable instructions for capturing an image for recording in the continuous shooting mode; and computer-executable instructions for controlling the movement of the focus lens before capturing a subsequent image for recording concurrently with performance of a development process of the captured image.

Further features of the present invention will become apparent from the following description of exemplary embodiments with reference to the attached drawings.

BRIEF DESCRIPTION OF THE DRAWINGS

FIGS. 12A and 12B illustrate a flow chart of an exemplary continuous shooting interval AF process according to the first exemplary embodiment according to an aspect of the present invention.

FIGS. 16A and 16B illustrate a flow chart of an exemplary continuous shooting interval AF process B according to the second exemplary embodiment.

FIG. 17 is an exemplary timing diagram of the continuous shooting interval AF process according to the second exemplary embodiment of the present invention.

DESCRIPTION OF THE EMBODIMENTS

Various exemplary embodiments of the present invention are now herein described below.

First Exemplary Embodiment

A first exemplary embodiment of the present invention is described below with reference to the accompanying drawings. In the first exemplary embodiment, the focus control operation during a continuous shooting interval is achieved even in a system that cannot compute the focus evaluation value and perform image processing on a main exposure image signal at the same time due to resource contention.

Figure 1:
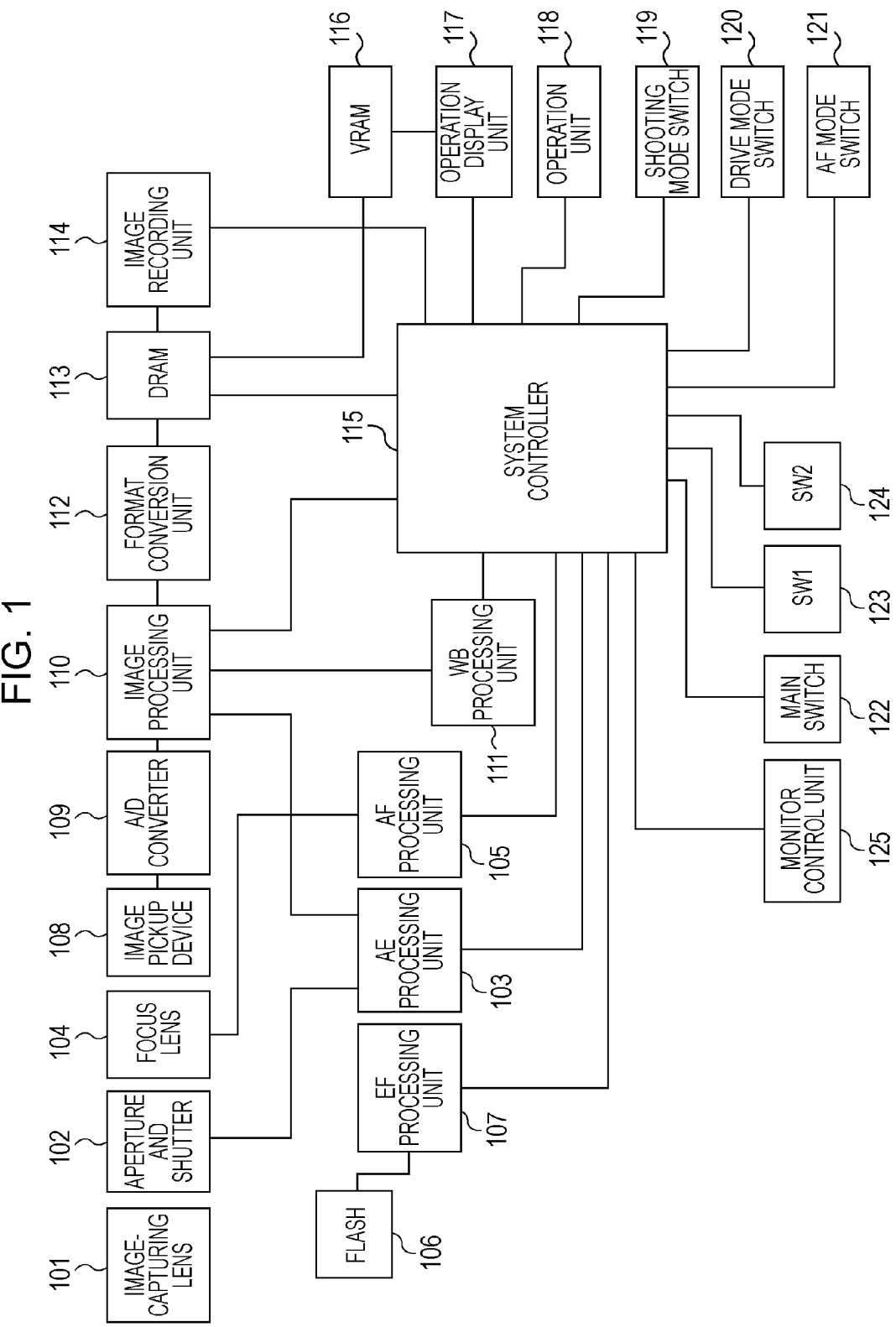
FIG. 1 is a block diagram of an example circuit of an electronic camera according to first to third exemplary embodiments of the present invention.

FIG. 1 is a block diagram of an exemplary circuit configuration of an electronic camera system according to the first exemplary embodiment of the present invention. The electronic camera system includes an image-capturing lens 101 having a zoom mechanism, an aperture and shutter 102 for controlling the amount of light, and an AE processing unit 103, a focus lens 104 for focusing light on an image pickup device, an AF processing unit 105, a flash 106, an EF processing unit 107, and an image pickup device 108 serving as a light detecting unit or a photoelectric conversion unit for converting light reflected off a subject to an electrical signal. The electronic camera system further includes an A/D converter 109. The A/D converter 109 includes a CDS circuit for reducing output noise of the image pickup device 108 and a non-linear amplifier circuit that operates before A/D conversion is performed. The electronic camera system further includes an image processing unit 110 and a white-balance (WB) processing unit 111.

The electronic camera system further includes a format conversion unit 112, a high-speed internal memory 113, such as a random access memory (hereinafter referred to as a "DRAM"), an image recording unit 114 including a recording medium (e.g., a memory card) and an interface thereof, and a system controller 115 for controlling the system (e.g., the image capturing sequence). The electronic camera system further includes an image display memory 116 (hereinafter referred to as a "VRAM") and an operation display unit 117 for displaying operation assistance information and the camera state. In addition, the operation display unit 117 displays an image to be captured and AF areas during a shooting operation. The electronic camera system further includes an operation unit 118 for a user to externally operate the electronic camera system.

The electronic camera system further includes a shooting mode switch 119 for setting a shooting mode, such as a program mode, a landscape mode, a portrait mode, and a sport mode, and a drive mode switch (SW) 120 for setting a drive mode, such as a single shooting mode, a continuous shooting mode, and a self-timer shooting mode. The electronic camera system further includes an AF mode switch 121 for switching between a continuous AF mode in which a subject is focused on at all times and a single AF mode in which a subject is focused on in one scanning operation immediately before the shooting operation, and a main switch 122 for powering on the electronic camera system. The electronic camera system further includes a standby switch 123 (hereinafter, this switch is also referred to as a "switch SW1") for starting a shooting standby operation, such as the AF and AE operations, and a shooting switch 124 (hereinafter, this switch is also referred to as a "switch SW2") for starting an actual shooting operation after the switch SW1 is operated. The electronic camera system further includes a monitor control unit 125 for controlling the output of an image to a monitor under the control of the system controller 115.

The DRAM 113 is used for a high-speed buffer serving as an image storing unit that temporarily stores an image or a working memory used for compression or decompression of an image. The operation unit 118 includes, for example, a menu button for inputting a variety of settings, such as settings for the shooting function and the image playback function of the image pickup apparatus, a zoom lever for zooming the imaging-capturing lens, and an operation mode selector switch for switching between a shooting mode and a playback mode.

Figure 2:
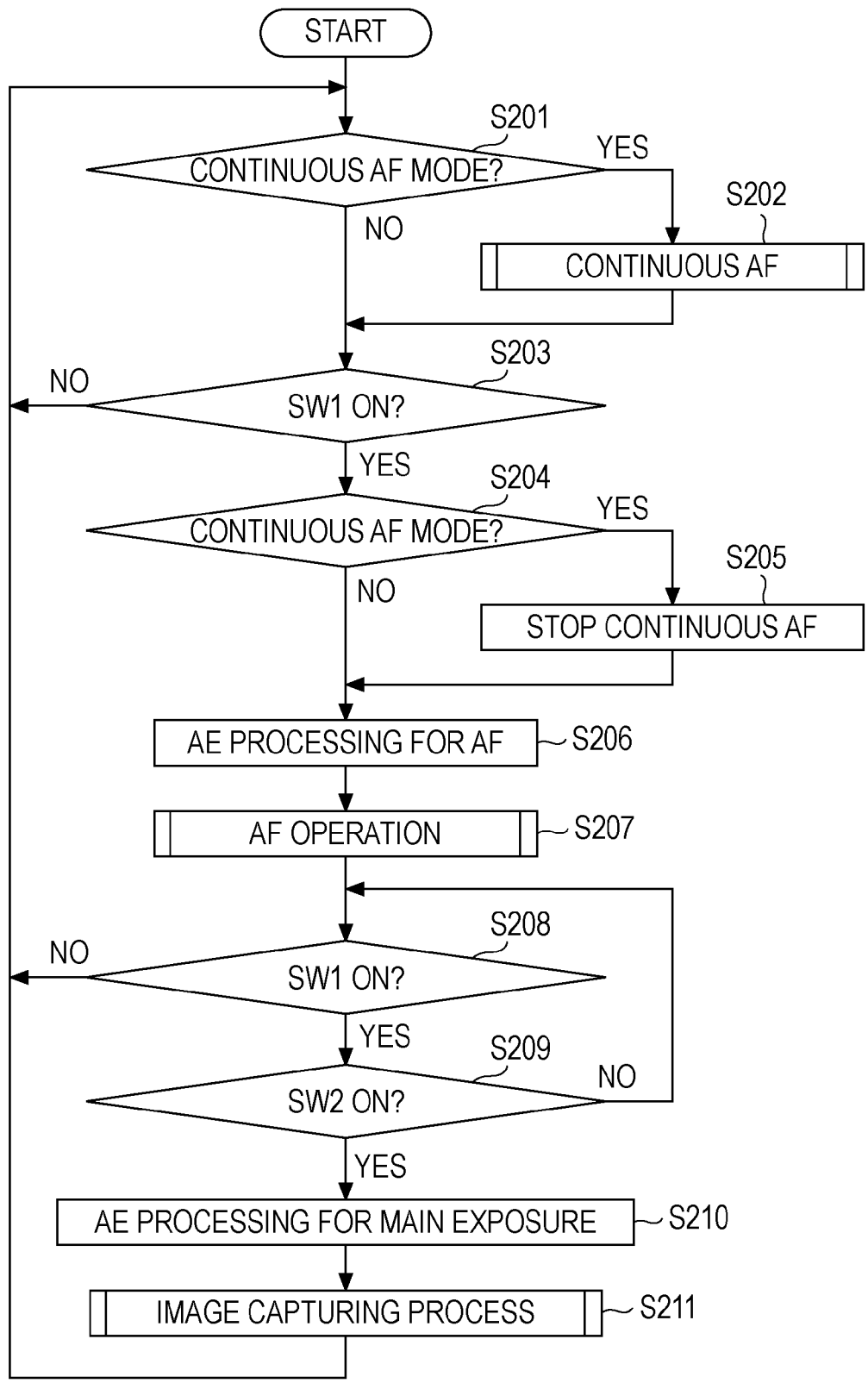
FIG. 2 is a flow chart of an exemplary operation of the electronic camera according to the first exemplary embodiment of the present invention.

FIG. 2 is a flow chart illustrating the operation of the electronic camera according to the first exemplary embodiment of the present invention starting from the power-on. This operation is performed by the system controller 115.

At step S201, the system controller 115 determines whether the AF mode is a continuous AF mode or a single AF mode. If the AF mode is a continuous AF mode (YES in step S201), the process proceeds to step S202. Otherwise (NO in step S201), the process proceeds to step S203. At step S202, a continuous AF process is performed in accordance with a flow chart of FIG. 3, which is described later. At step S203, the on/off state of the switch SW1 is checked. If the switch SW1 is ON (YES in step S203), the process proceeds to step S204. Otherwise (NO in step S203), the process returns to step S201. That is, operation of the switch SW1 starts an image capturing standby operation for the AF and AE processes.

At step S204, the system controller 115 determines whether the AF mode is a continuous AF mode or a single AF mode. If the AF mode is a continuous AF mode (YES in step S204), the process proceeds to step S205, where the currently running continuous AF operation is stopped. The process then proceeds to step S206. At step S206, the AE processing unit 103 performs an AE operation for the AF operation using the output from the image processing unit 110. At step S207, AF operation is performed in accordance with a flow chart of FIG. 4, which is described below. At step S208, the on/off state of the switch SW1 is checked. If the switch SW1 is ON (YES in step S208), the process proceeds to step S209. Otherwise (NO in step S208), the process returns to step S201.

At step S209, the on/off state of the switch SW2 is checked. If the switch SW2 is ON (YES in step S209), the process proceeds to step S210. Otherwise (NO in step S209), the process returns to step S208, where the focus is locked until the switch SW1 is turned OFF or the switch SW2 is turned ON. That is, the switch SW2 starts an image capturing operation after the switch SW1 is operated. At step S210, the AE processing for the subsequent main exposure is performed. At step S211, the image capturing process is performed in accordance with a flow chart of FIG. 11, which is described below. This image capturing process includes a continuous shooting operation, a focus control operation during the continuous shooting interval, and a determination process for determining whether the continuous shooting operation has started. After step S211 is completed, the process returns to step S201.

Figure 3:
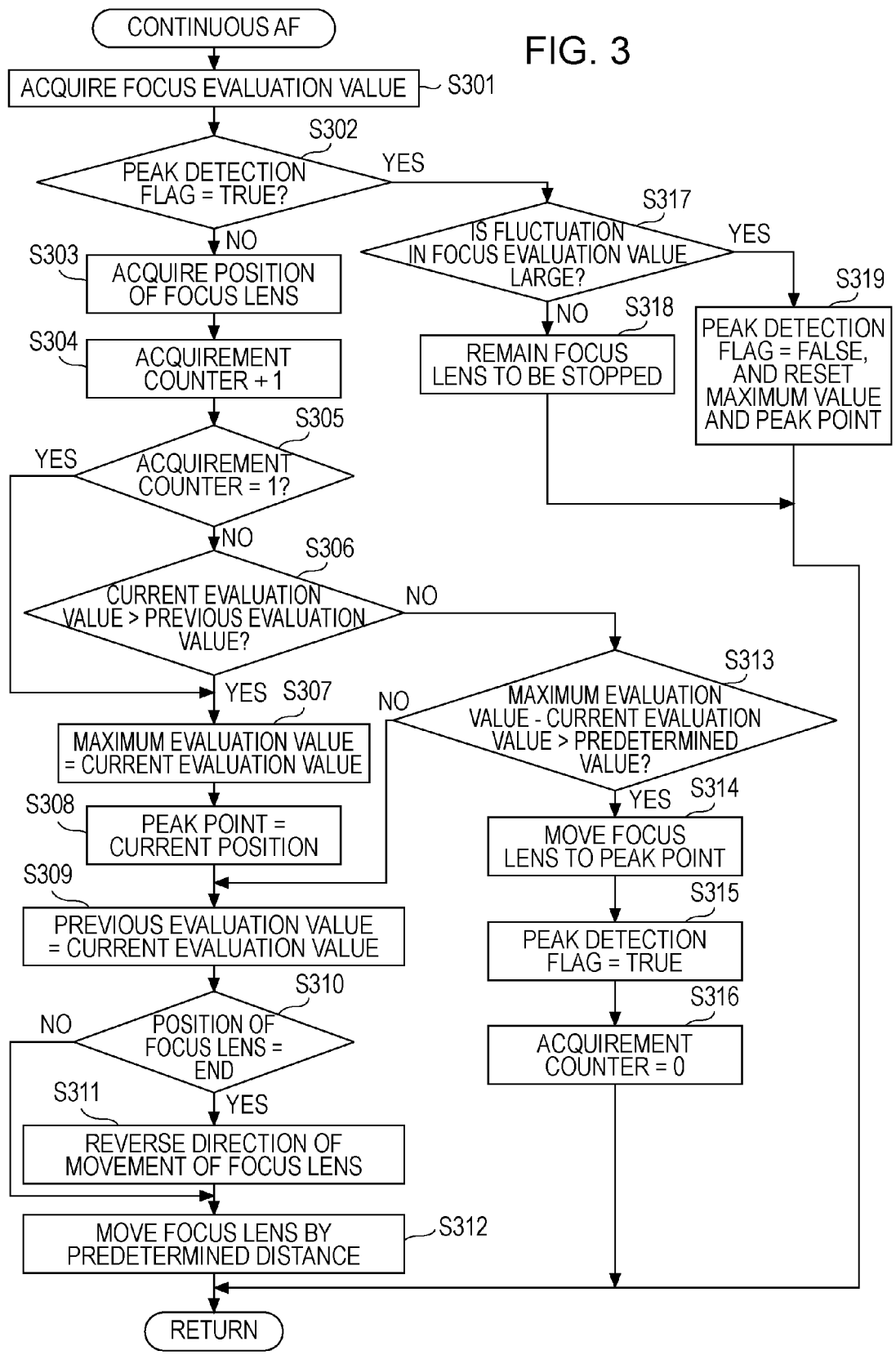
FIG. 3 is a flow chart of an exemplary continuous AF subroutine shown in FIG. 2 according to an aspect of the present invention.

An exemplary subroutine of the continuous AF process at step S202 of FIG. 2 is described next with reference to a flow chart of FIG. 3.

At step S301, the system controller 115 acquires a focus evaluation value that indicates the contrast ratio of the captured image. At step S302, it is determined whether a peak detection flag is TRUE. If the peak detection flag is TRUE (YES in step S302), the process proceeds to step S317. Otherwise (NO in step S302), the process proceeds to step S303. At step S303, the system controller 115 acquires the current position of the focus lens 104. At step S304, an acquirement counter used for counting the acquirement of the focus evaluation value and the acquirement of the current position of the focus lens 104 is incremented by one. This acquirement counter is initialized to zero in an initialization process (not shown) in advance. At step S305, it is determined whether the value of the acquirement counter is one. If the value of the acquirement counter is one (YES in step S305), the process proceeds to step S307. Otherwise (NO in step S305), the process proceeds to step S306.

At step S306, it is determined whether the current focus evaluation value is greater than the previous focus evaluation value. If the current focus evaluation value is greater than the previous focus evaluation value (YES in step S306), the process proceeds to step S307. Otherwise (NO in step S306), the process proceeds to step S313. At step S307, the current focus evaluation value is considered to be a maximum focus evaluation value and is stored in an internal calculation memory (not shown) of the system controller 115. Thereafter, at step S308, the current position of the focus lens 104 is considered to be a peak point of the focus evaluation value and is stored in the internal calculation memory of the system controller 115. At step S309, the current focus evaluation value is set to be the previous focus evaluation value and is stored in the internal calculation memory of the system controller 115.

At step S310, it is determined whether the current position of the focus lens 104 corresponds to an end of a scan range for detecting the focusing state by acquiring the focus evaluation value. If the current position of the focus lens 104 corresponds to an end of the scan range (YES in step S310), the process proceeds to step S311. Otherwise (NO in step S310), the process proceeds to step S312. At step S311, the moving direction of the focus lens 104 is reversed. Thereafter, at step S312, the focus lens 104 is moved by a predetermined distance.

However, if it is determined at step S306 that the current focus evaluation value is not greater than the previous focus evaluation value (NO in step S306) and the process proceeds to step S313, it is determined whether (the maximum focus evaluation value—the current focus evaluation value) is greater than a predetermined value. If (the maximum focus evaluation value—the current focus evaluation value) is greater than a predetermined value (YES in step S313), the process proceeds to step S314. Otherwise (NO in step S313), the process proceeds to step S309. Here, if (the maximum focus evaluation value—the current focus evaluation value) is greater than the predetermined value, that is, if the current focus evaluation value is decreased from the maximum focus evaluation value by more than the predetermined value, the maximum focus evaluation value is considered to be a value when the focus is at a peak point. If (the maximum focus evaluation value—the current focus evaluation value) is greater than the predetermined value and the process proceeds to step S314, the focus lens 104 is moved to the peak point which is stored at step S308 and at which the focus evaluation value is maximized. At step S315, the peak detection flag is set to TRUE. At step S316, the acquirement counter is set to zero.

If it is determined at step S302 that the peak detection flag is TRUE (YES in step S302) and the process proceeds to step S317, it is determined whether the focus evaluation value fluctuates with respect to the maximum focus evaluation value by more than a predetermined ratio. If the focus evaluation value fluctuates with respect to the maximum focus evaluation value by more than the predetermined ratio (YES in step 317), the process proceeds to step S319. In contrast, if the fluctuation is small (NO in step S317), the process proceeds to step S318. At step S318, the position of the focus lens 104 remains unchanged. In contrast, at step S319, the peak detection flag is set to FALSE in order to redetermine the position of the focus lens that maximizes the focus evaluation value. The maximum focus evaluation value and the peak point are reset.

In this way, the focus lens 104 is driven so that the focus is always on the subject in the continuous AF process.

An exemplary subroutine of the AF operation at step S207 shown in FIG. 2 is described next with reference to a flow chart of FIG. 4.

At step S401, the system controller 115 determines whether the AF mode is a continuous AF mode or a single AF mode. If the AF mode is a continuous AF mode (YES in step S401), the process proceeds to step S402. Otherwise (NO in step S401), the process proceeds to step S404. At step S402, it is determined whether the peak detection flag shown in the flow chart of FIG. 3 is TRUE. If the peak detection flag is TRUE (YES in step S402), the process proceeds to step S403. However, if the peak detection flag is FALSE (NO in step S402), the process proceeds to step S404.

Figure 7:
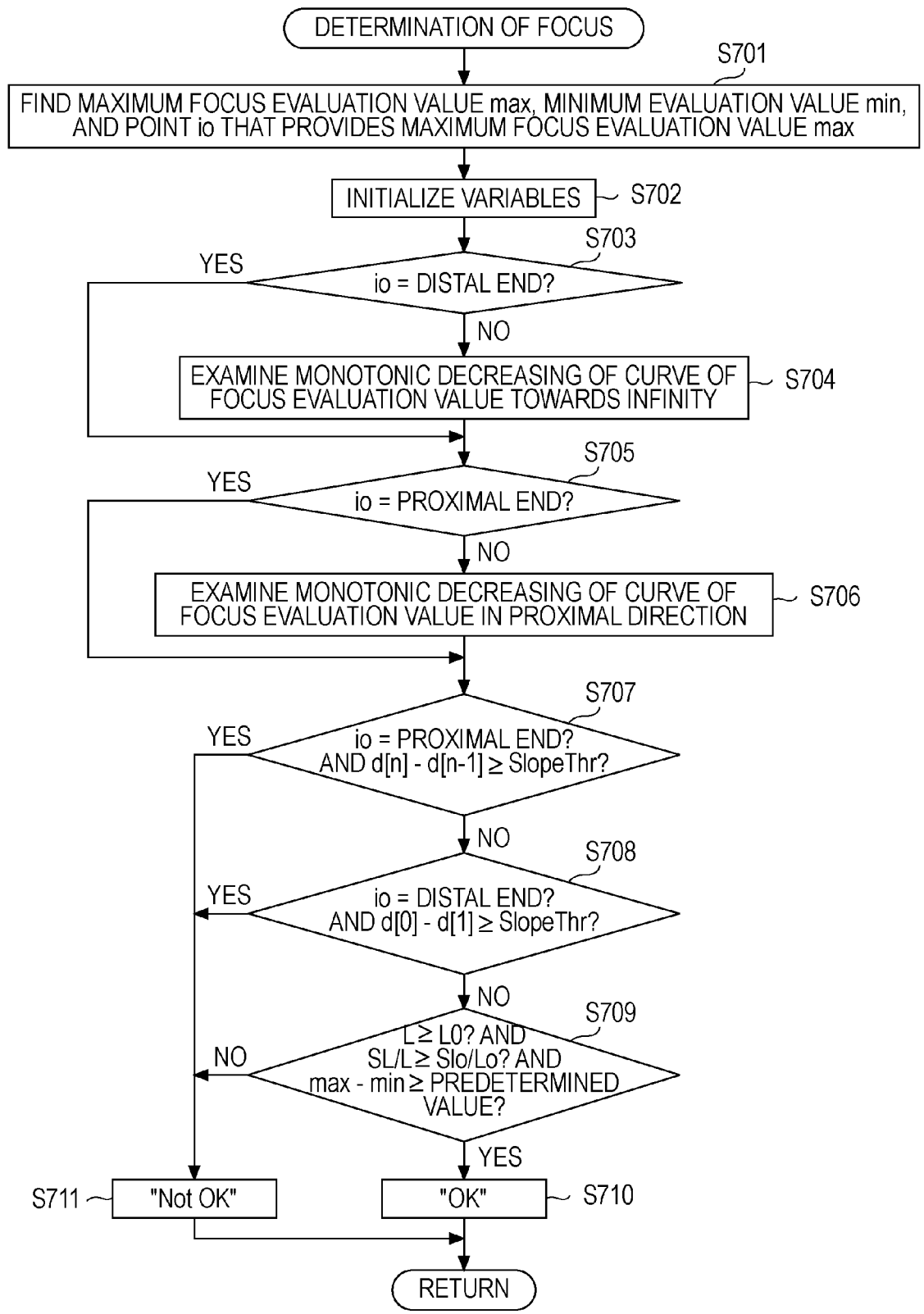
FIG. 7 is a flow chart of an exemplary focus determination subroutine shown in FIG. 4 according to an aspect of the present invention.

At step S403, since the focus lens 104 is located near the in-focus position at which the focus evaluation value is maximized due to the continuous AF operation, the system controller 115 determines a scan range having a predetermined narrow scan width at the center of which is the current focus lens position in order to improve the accuracy of the focusing operation. Here, the scan range is determined so that the number of scan data samples required for the determination of the in-focus state shown in FIG. 7 is obtained and the scan time is not too long. At step S404, the entire AF available area in the current set mode is determined to be the scan range.

Figure 6:
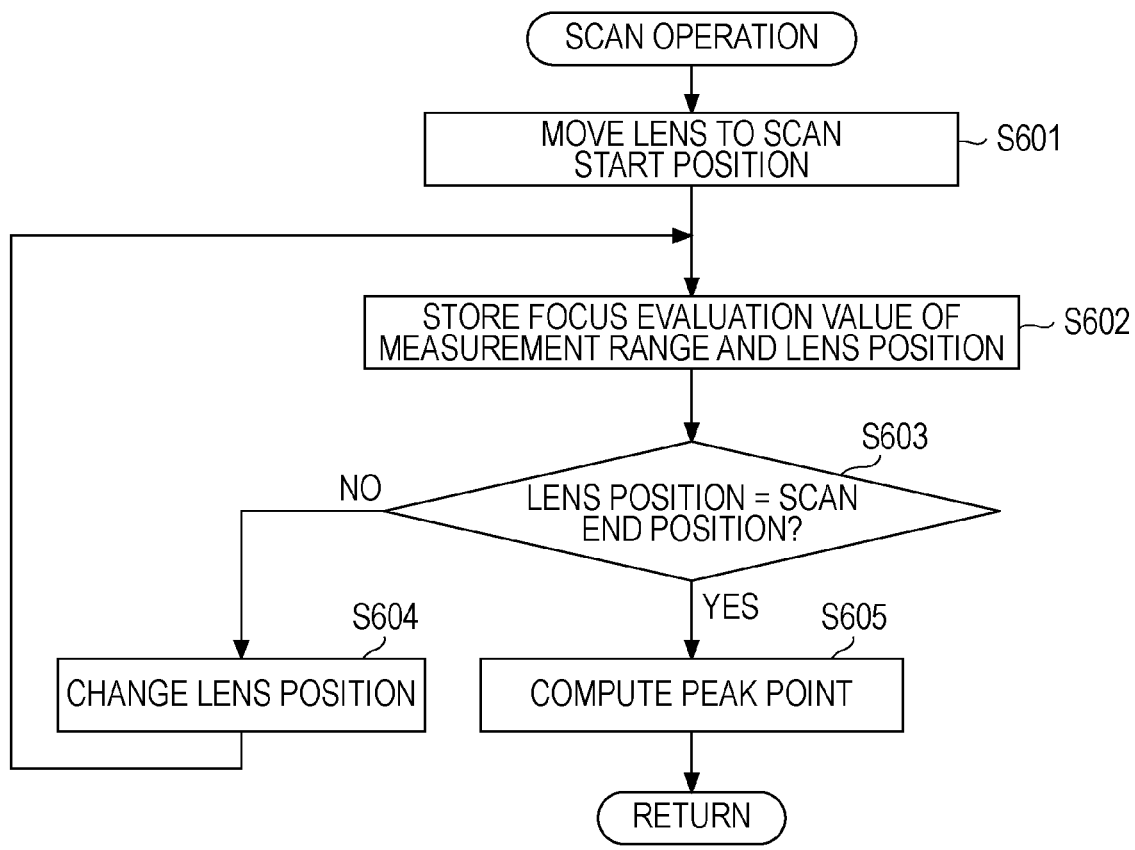
FIG. 6 is a flow chart of an exemplary scan subroutine shown in FIG. 4 according to an aspect of the present invention.

At step S405, the scan operation is performed over the scan range determined at step S403 or step S404 in accordance with a flow chart of FIG. 6, which is described below. At step S406, the in-focus state is determined using scan data stored at step S405 in accordance with a flow chart of FIG. 7, which is described below. At step S407, if the result of the determination of the in-focus state is "OK" (YES in step S407), the process proceeds to step S410. However, if the result of the determination of the in-focus state is "Not OK" (NO in step S407), the process proceeds to step S408. At step S408, it is determined whether the scan has been completed over the entire AF available area in the current set mode. If the scan has been completed over the entire AF available area (YES in step S408), the process proceeds to step S409. Otherwise (NO in step S408), the process returns to step S404. At step S409, the focus lens 104 is moved to a predetermined position referred to as a "fixed point" and then the process returns. In contrast, at step S410, the focus lens 104 is moved to a peak point calculated at step S406 and then the process returns.

The AF operation described above is applied to the continuous shooting mode and the single shooting mode.

Figure 4:
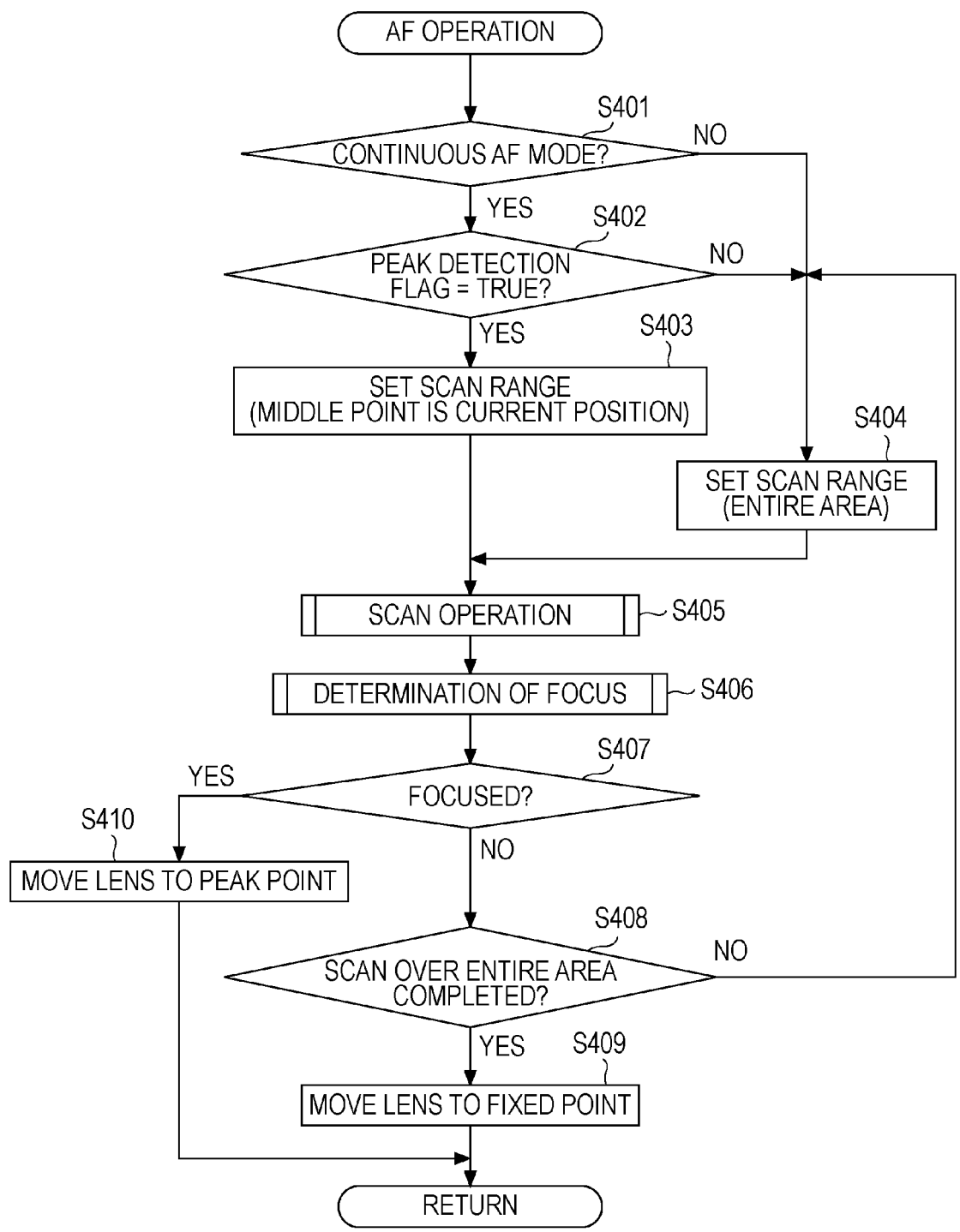
FIG. 4 is a flow chart of an exemplary AF operation subroutine shown in FIG. 2 according to an aspect of the present invention.

A scan subroutine performed at step S405 of FIG. 4 is described next with reference to a flow chart of FIG. 6.

At step S601, the focus lens 104 is moved to a scan start position. The scan start position is determined to be at one end of the determined scan range. At step S602, the focus evaluation value of the AF area set in the image capturing screen and the position of the focus lens 104 are stored in the internal calculation memory of the system controller 115. At step S603, it is determined whether the lens position corresponds to the scan end position. If the lens position corresponds to the scan end position (YES in step S603), the process proceeds to step S605. Otherwise (No in step S603), the process proceeds to step S604. The scan end position is determined to be the other end of the determined scan range. At step S604, the focus lens 104 is driven to move in a predetermined direction by a predetermined distance, and then the process returns to step S602. At step S605, the peak point of the focus evaluation value is calculated on the basis of the focus evaluation value stored at step S602 and the lens position thereof, and then the process returns.

An exemplary focus determination subroutine performed at step S406 of FIG. 4 is described next with reference to FIGS. 7 to 10.

Figure 10:
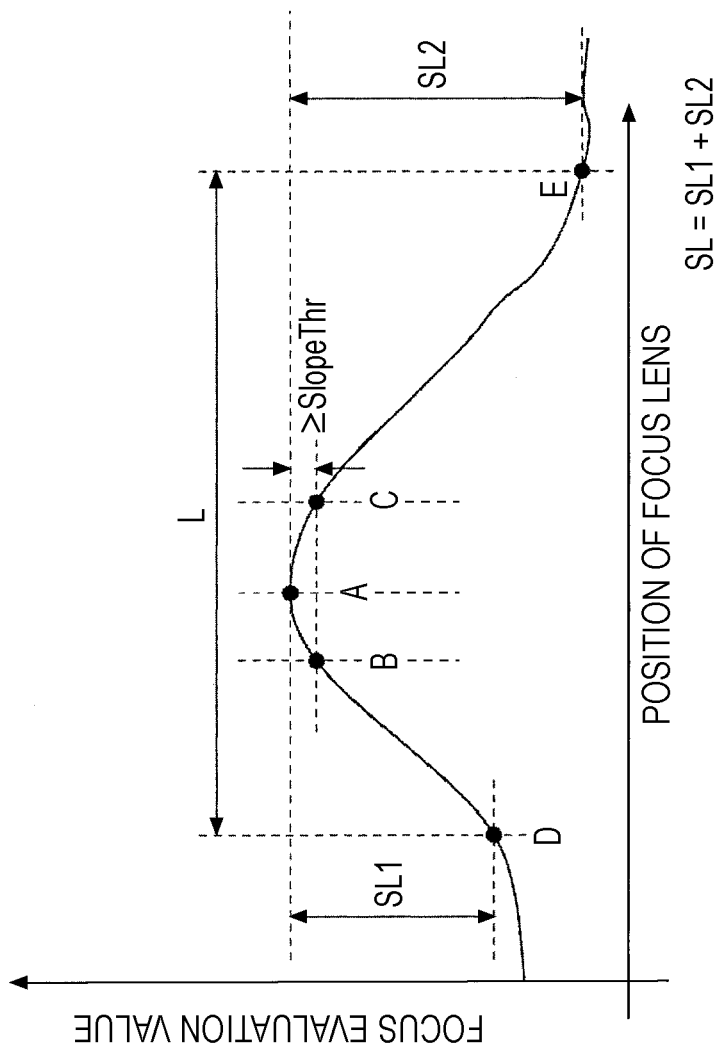
FIG. 10 is a diagram illustrating the concept of determination of a focus evaluation value according to an aspect of the present invention.

Except for a special condition, such as when foreground and background subjects exist in the frame, the focus evaluation value exhibits, as shown in FIG. 10, a mountain-shaped curve in a graph where the abscissa represents the position of a focus lens and the ordinate represents the focus evaluation value. Accordingly, the in-focus state is determined by determining whether the curve of the focus evaluation value is mountain-shaped. The mountain shape is determined on the basis of a difference between the maximum focus evaluation value and the minimum focus evaluation value, the length of a tilted portion at an angle of more than or equal to a predetermined value (SlopeThr), and the gradients of the tilted portions. The determination result is output in the form of one of the following two values:

"OK": Focus control is possible using the peak point of the focus evaluation value; and "Not OK": The contrast of a subject is insufficient or the subject is located out of the scanned distance range.

Here, as shown in FIG. 10, the end points of the slopes starting from the top of the mountain-shaped curve (i.e., a point A) are referred to as points D and E. Let L denote the width of the mountain-shaped curve (i.e., the distance between the points D and E) and SL denote a sum (SL1+SL2), where SL1 is a difference in focus evaluation value between the points A and D and SL2 is the difference in focus evaluation value between the points A and E.

FIG. 7 is a detailed flow chart of the focus determination subroutine performed at step S406 of FIG. 4.

At step S701, a maximum focus evaluation value max, a minimum focus evaluation value min, and a scan point io that provides the maximum focus evaluation value max are computed. At step S702, a variable L that indicates the width of the mountain-shaped curve of the focus evaluation value and a variable SL that indicates the gradient of the mountain-shaped curve are initialized to zero. At step S703, it is determined whether the scan point io that provides the maximum evaluation value is located at a distal end of a predetermined scan range. If the scan point io is not located at the distal end of the predetermined scan range (NO in step S703), the process proceeds to step S704, where monotonic decreasing of the curve of the focus evaluation value towards infinity is examined. However, if the scan point io is located at the distal end of the predetermined scan range (YES in step S703), the process at step S704 is skipped and the process proceeds to step S705.

Figure 8:
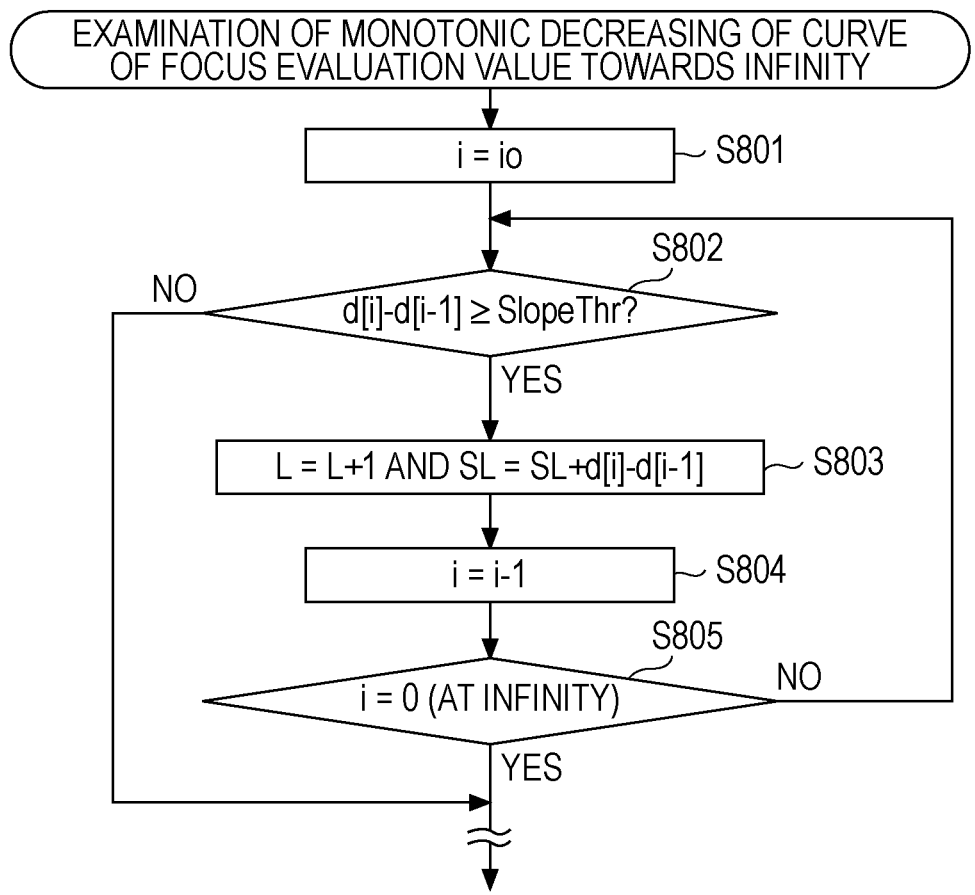
FIG. 8 is a flow chart of an exemplary subroutine for examining a monotonic decreasing of a curve of a focus evaluation value towards infinity according to an aspect of the present invention.

The process of examining monotonic decreasing of the curve of the focus evaluation value towards infinity at step S704 is described next with reference to FIG. 8. FIG. 8 is a flow chart of this process.

At step S801, a counter variable i is initialized to io. At step S802, the difference between a focus evaluation value d[i] at a scan point i and a focus evaluation value d[i−1] at a scan point i−1 which is closer to infinity than the scan point i by one scan point is compared with a constant value SlopeThr. If d[i]−d[i−1]≥SlopeThr, it is determined that monotonic decreasing of the curve of the focus evaluation value towards infinity occurs (YES at step S802). The process then proceeds to step S803. At step S803, the variable L that represents the length of a portion (the width of the mountain-shaped curve) where the curve of the focus evaluation value is sloped at an angle greater than or equal to a predetermined value and the variable SL that represents the decrease in the monotonic decreasing interval are updated as follows:

$$L=L+1$$

$$SL=SL+(d[i]-d[i-1])$$

However, if d[i]−d[i−1]<SlopeThr, it is determined that monotonic decreasing of the curve of the focus evaluation value towards infinity does not occur (NO in step S802). The process of examining monotonic decreasing of the curve of the focus evaluation value towards infinity is completed. The process then proceeds to step S705.

When the system controller 115 continues the process of examining monotonic decreasing of the curve of the focus evaluation value towards infinity, the process proceeds to step S804. At step S804, the detection point is moved towards infinity by one scan point by setting i=i+1. At step S805, it is determined whether the counter i is equal to the value of the distal end of the predetermined scan range (i.e., a value zero). If the counter i is equal to zero, that is, if the start point of the scan for detecting the monotone decreasing reaches the distal end of the predetermined scan range (YES in step S805), the process of examining monotonic decreasing of the curve of the focus evaluation value towards infinity is completed. Thereafter, the process proceeds to step S705 shown in FIG. 7. In this way, the process of examining monotonic decreasing of the curve of the focus evaluation value towards infinity is performed starting from i=io.

Referring back to FIG. 7, at step S705, it is determined whether the scan point io that provides the maximum value is at the proximal end of the predetermined scan range. If the scan point io is not at the proximal end of the predetermined scan range (NO in step S705), the process proceeds to step S706. At step S706, the monotonic decreasing of the curve of the focus evaluation value in the proximal direction is examined. However, if the scan point io is at the proximal end of the predetermined scan range (YES in step S705), the process at step S706 is skipped and the process proceeds to step S707.

Figure 9:
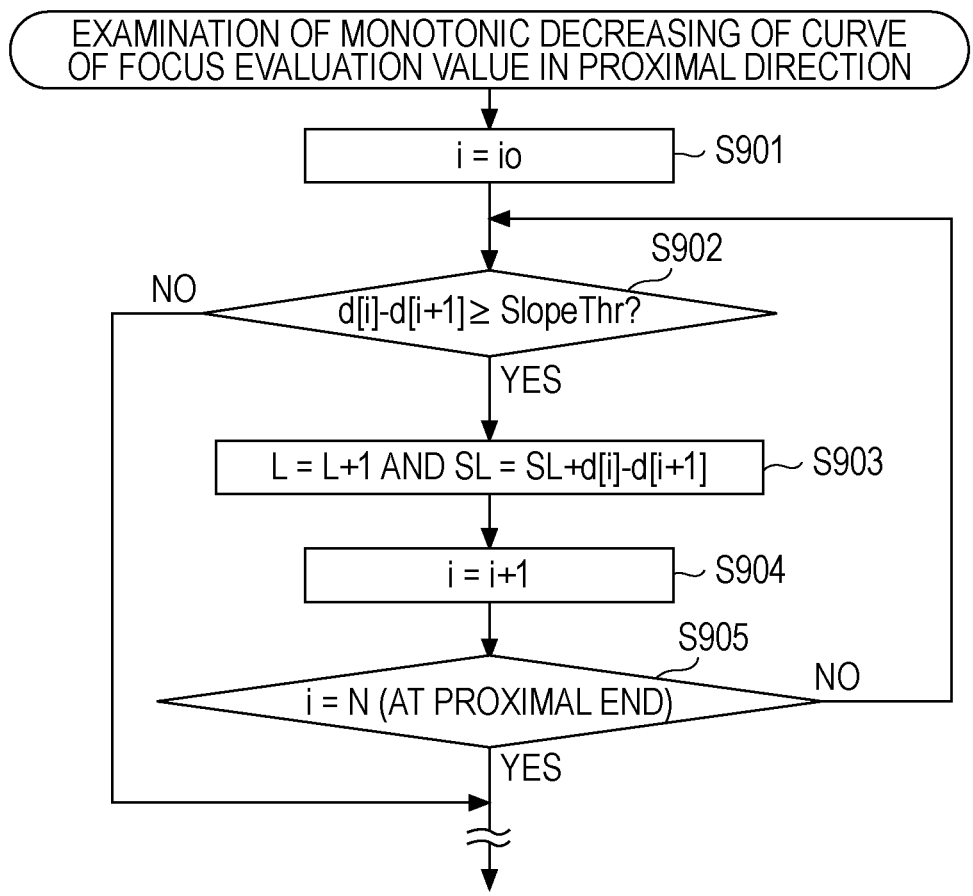
FIG. 9 is a flow chart of an exemplary subroutine for examining a monotonic decreasing of a curve of a focus evaluation value in a proximal direction according to an aspect of the present invention.

An exemplary process of examining the monotonic decreasing of the curve of the focus evaluation value in the proximal direction at step S706 is described next with reference to FIG. 9. FIG. 9 is a flow chart of this process.

At step S901, a counter variable i is initialized to io. At step S902, the difference between a focus evaluation value d[i] at a scan point i and a focus evaluation value d[i+1] at a scan point i+1 which is closer to the proximal end point than the scan point i by one scan point is compared with the constant value SlopeThr. If d[i]−d[i+1]≥SlopeThr, it is determined that the monotonic decreasing of the curve of the focus evaluation value in the proximal direction occurs (YES in step S902). The process then proceeds to step S903. At step S903, the variable L that represents the length of a portion (the width of the mountain-shaped curve) where the curve of the focus evaluation value is sloped at an angle greater than or equal to a predetermined value and the variable SL that represents the decrease in the monotonic decreasing interval are updated as follows:

$$L=L+1$$

$$SL=SL+(d[i]-d[i+1])$$

However, if d[i]−d[i+1]<SlopeThr, it is determined that the monotonic decreasing of the curve of the focus evaluation value in the proximal direction does not occur (NO in step S902). The process of examining the monotonic decreasing of the curve of the focus evaluation value in the proximal direction is completed. The process then proceeds to step S707.

When the system controller 115 continues the process of examining the monotonic decreasing of the curve of the focus evaluation value in the proximal direction, the process proceeds to step S904. At step S904, the detection point is moved in the proximal direction by one scan point by setting i=i+1. At step S905, it is determined whether the counter i is equal to the value of the proximal end of the predetermined scan range (i.e., a value N). If the counter i is equal to N, that is, if the start point of the scan for detecting the monotone decreasing reaches the proximal end of the predetermined scan range (YES in step S905), the process for examining the monotonic decreasing of the curve of the focus evaluation value in the proximal direction is completed. Thereafter, the process proceeds to step S707 shown in FIG. 7. In this way, the process of examining the monotonic decreasing of the curve of the focus evaluation value in the proximal direction is performed starting from i=io.

After the processes for examining monotonic decreasing of the curve of the focus evaluation value towards infinity and in the proximal direction are completed, a variety of coefficients are compared with threshold values thereof to determine whether the obtained curve of the focus evaluation value has a mountain shape. Thus, the determination as to "OK" or "Not OK" is made.

Referring back to FIG. 7 again, at step S707, if the scan point io that provides the maximum focus evaluation value is at the proximal end of the predetermined scan range and the difference between a focus evaluation value d[n] at the proximal scan point n and a focus evaluation value d[n−1] at a scan point n−1 which is closer to infinity than the scan point n by one scan point is greater than or equal to the constant value SlopeThr (YES in step S707), the process proceeds to S711. Otherwise (NO in step S707), the process proceeds to S708. At step S708, if the scan point io that provides the maximum focus evaluation value is at the distal end of the predetermined scan range and the difference between a focus evaluation value d[0] at the distal scan point 0 and a focus evaluation value d[1] at a scan point 1 which is closer in the proximal direction than the scan point 0 by one scan point is greater than or equal to the constant value SlopeThr (YES in step S708), the process proceeds to S711. Otherwise (NO in step S708), the process proceeds to S709.

At step S709, if the three following conditions are satisfied: (a) the variable L that represents the length of a portion (the width of the mountain-shaped curve) where the curve of the focus evaluation value is sloped at an angle greater than or equal to a predetermined value is greater than or equal to a predetermined value Lo; (b) the average gradient SL/L of the sloped portion is greater than or equal to a predetermined value SLo/Lo; and (c) the difference between a maximum focus evaluation value max and a minimum focus evaluation value min is greater than or equal to a predetermined value (YES in step S709), the process proceeds to step S710. Otherwise (NO in step S709), the process proceeds to step S711. At step S710, since the obtained curve of the focus evaluation value has a mountain shape and the focus control of the subject is available, the determination result is "OK". At step S711, since the obtained curve of the focus evaluation value does not have a mountain shape and the focus control of the subject is not available, the determination result is "Not OK". In this way, the focus determination at step S406 in the flow chart of FIG. 4 is made.

An exemplary subroutine of the image capturing process at step S211 of FIG. 2 is described next with reference to a flow chart of FIG. 11. According to the first exemplary embodiment, the image capturing subroutine includes the determination of execution of a continuous shooting operation and focus control during a continuous shooting interval.

Figure 11:
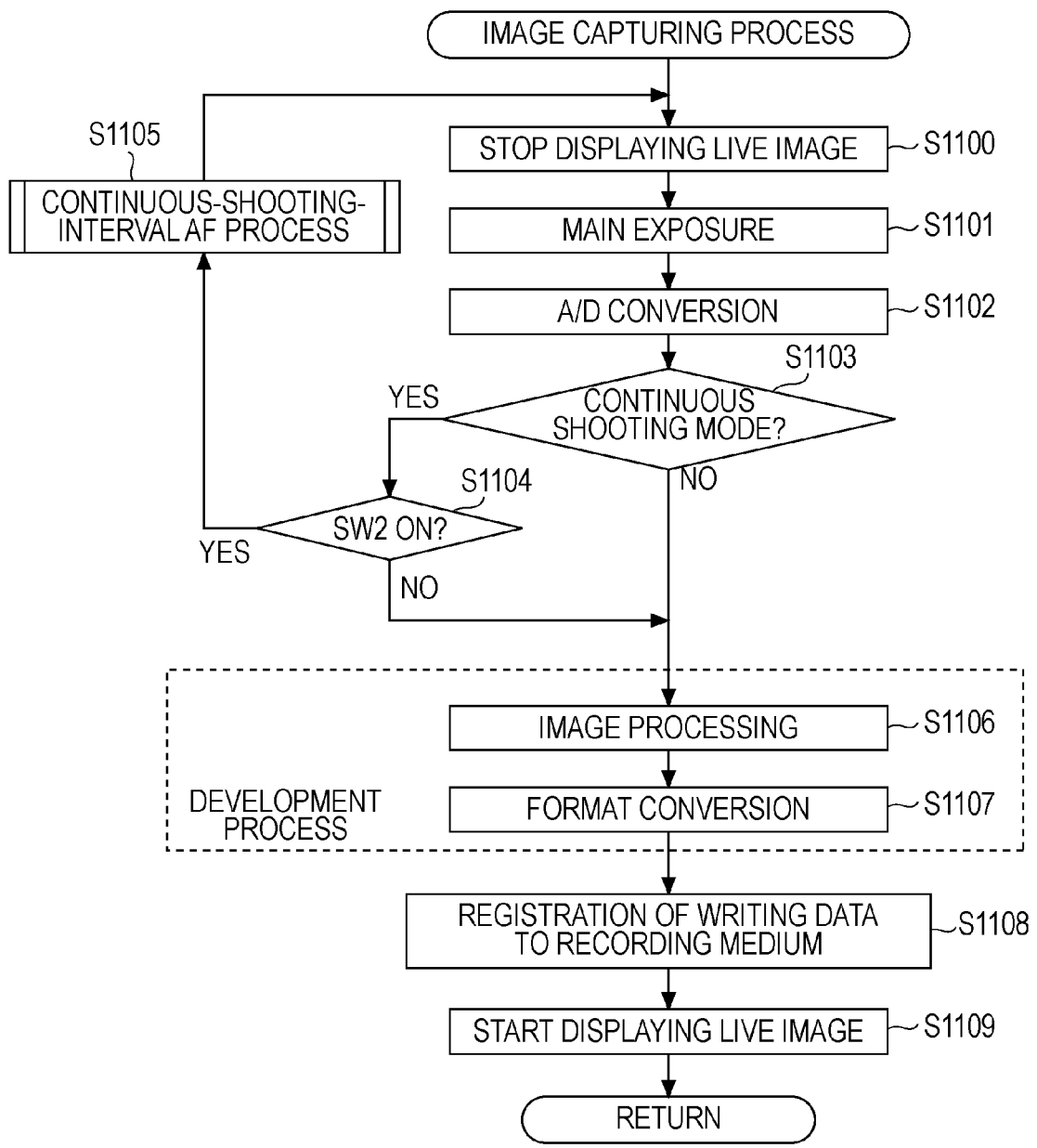
FIG. 11 is a flow chart of an exemplary image capturing process subroutine shown in FIG. 2 according to an aspect of the present invention.

At step S1100 shown in FIG. 11, the monitor control unit 125 stops displaying a live image. At step S1101, the image pickup device 108 is exposed. An image formed on the surface of the image pickup device 108 is photoelectrically converted to an analog signal. At step S1102, the analog signal is transferred to the A/D converter 109. The A/D converter 109 performs pre-processing including reduction of output noise of the image pickup device 108 and a non-linear process first. The A/D converter 109 then converts the analog signal to a digital signal. At step S1103, it is determined whether the current set mode is a continuous shooting mode. If the current set mode is a continuous shooting mode (YES in step S1103), the process proceeds to step S1104. Otherwise (NO in step S1103), the process proceeds to step S1106.

At step S1104, it is determined whether the switch SW2 is continuously depressed. If the ON state of the switch SW2 is maintained (YES in step S1104), the process proceeds to a continuous shooting interval AF processing subroutine at step S1105. The continuous shooting interval AF processing at step S1105 is described below with reference to FIGS. 12 and 13.

At step S1106, a signal output from the A/D converter 109 is subjected to white balance adjustment by the white-balance (WB) processing unit 111. The image processing unit 110 corrects this signal into an appropriate output image signal. At step S1107, the format conversion unit 112 converts the format of the output image signal to, for example, a JPEG format. The converted output image signal is temporarily stored or recorded in the DRAM 113 serving as a working memory. As used herein, the series of processes from steps S1106 to S1107 is referred to as a "development process".

At step S1108, a write request is registered. The write request is used for requesting performance of a data write process (delayed write process) in which data is written to a recording medium concurrently with another process. That is, the write request is used to instruct the image recording unit 114 to store data in the DRAM 113 serving as a working memory in a memory of the camera or on an external recording medium (such as a memory card) loaded in the camera. Thus, the live image can be displayed during storing of data on the recording medium.

At step S1109, the display of the live image that has been stopped at step S1100 is resumed. As used herein, the term "live image" refers to a captured image for which image data is not to be record on the recording medium. The monitor control unit 125 controls the monitor to display this live image. By viewing the live image, a photographer can monitor the angle of field and the subject even during the continuous shooting operation.

As noted above, if the continuous shooting mode is set and the switch SW2 is depressed, the continuous shooting operation is continuously executed. If one of the above-described conditions is not satisfied, a single shooting operation is executed.

Figure 5:
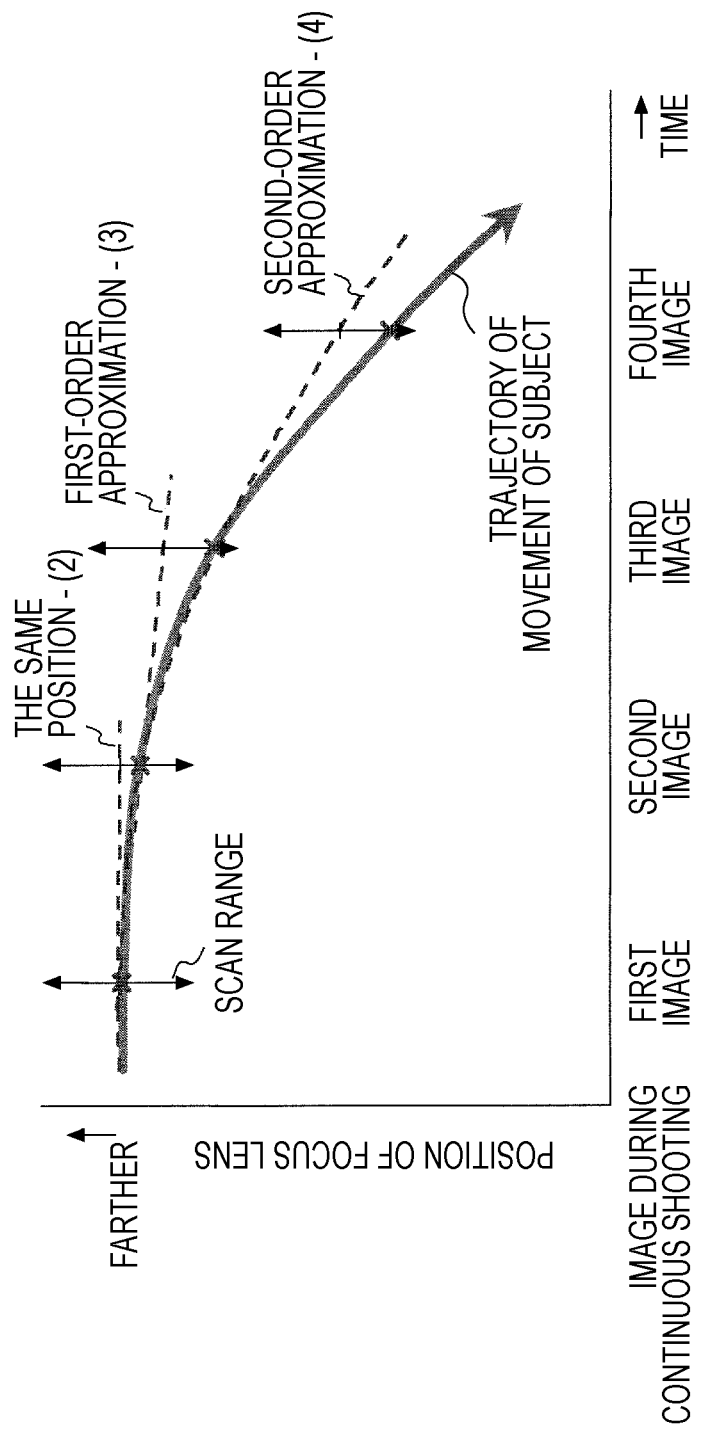
FIG. 5 is a diagram illustrating an exemplary method for setting a scan range shown in FIG. 4 according to an aspect of the present invention.

The exemplary continuous shooting interval AF processing subroutine at step S1105 shown in FIG. 11 is described next with reference to FIGS. 5, 12, and 13. FIG. 5 illustrates the setting of the scan range. FIG. 12 is a flow chart of an exemplary continuous shooting interval AF processing. FIG. 13 is an exemplary timing diagram when the continuous shooting interval AF processing shown by the flow chart in FIG. 12 is executed concurrently with other processes.

Figure 12A:
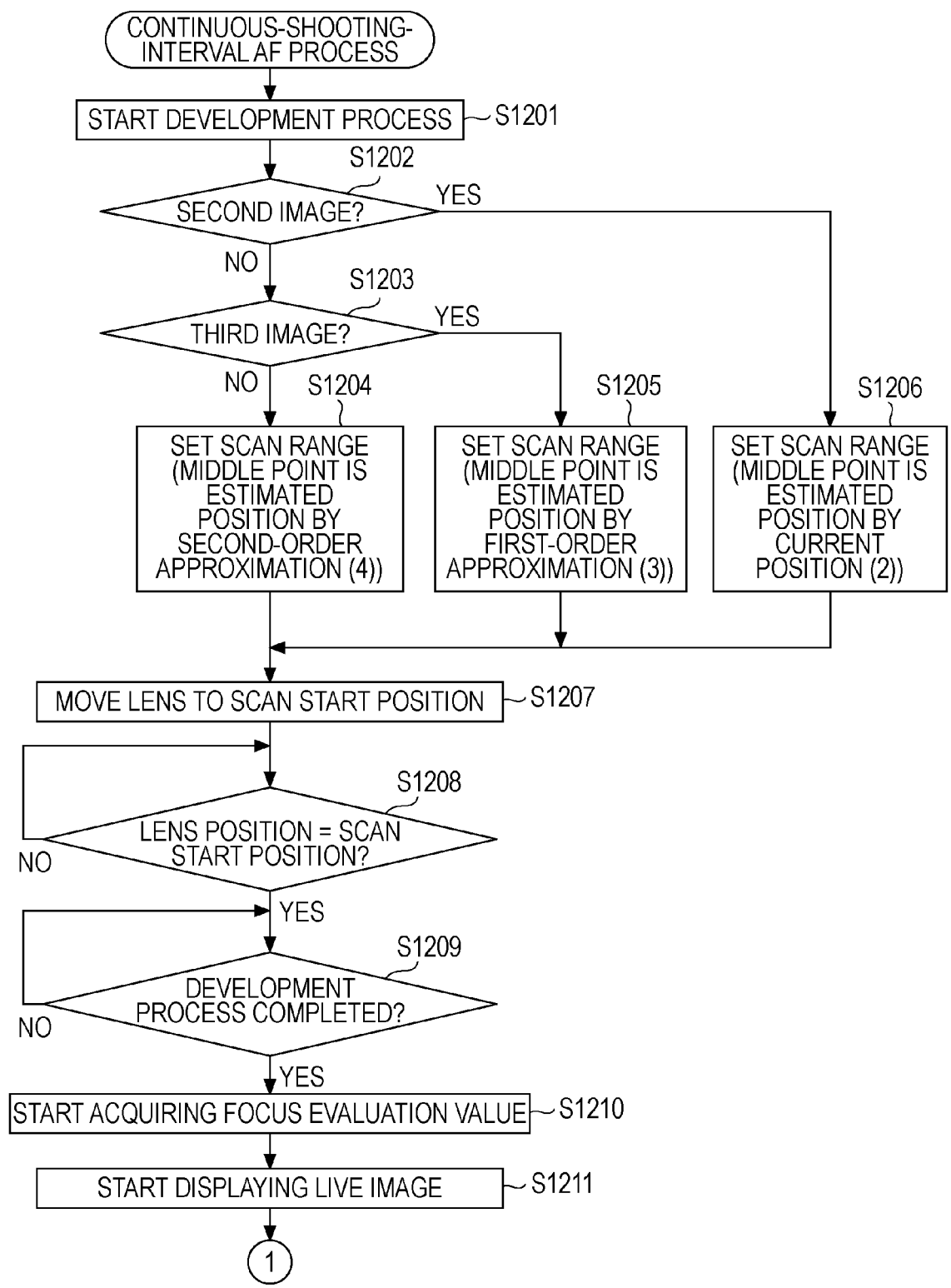
Figure 13:
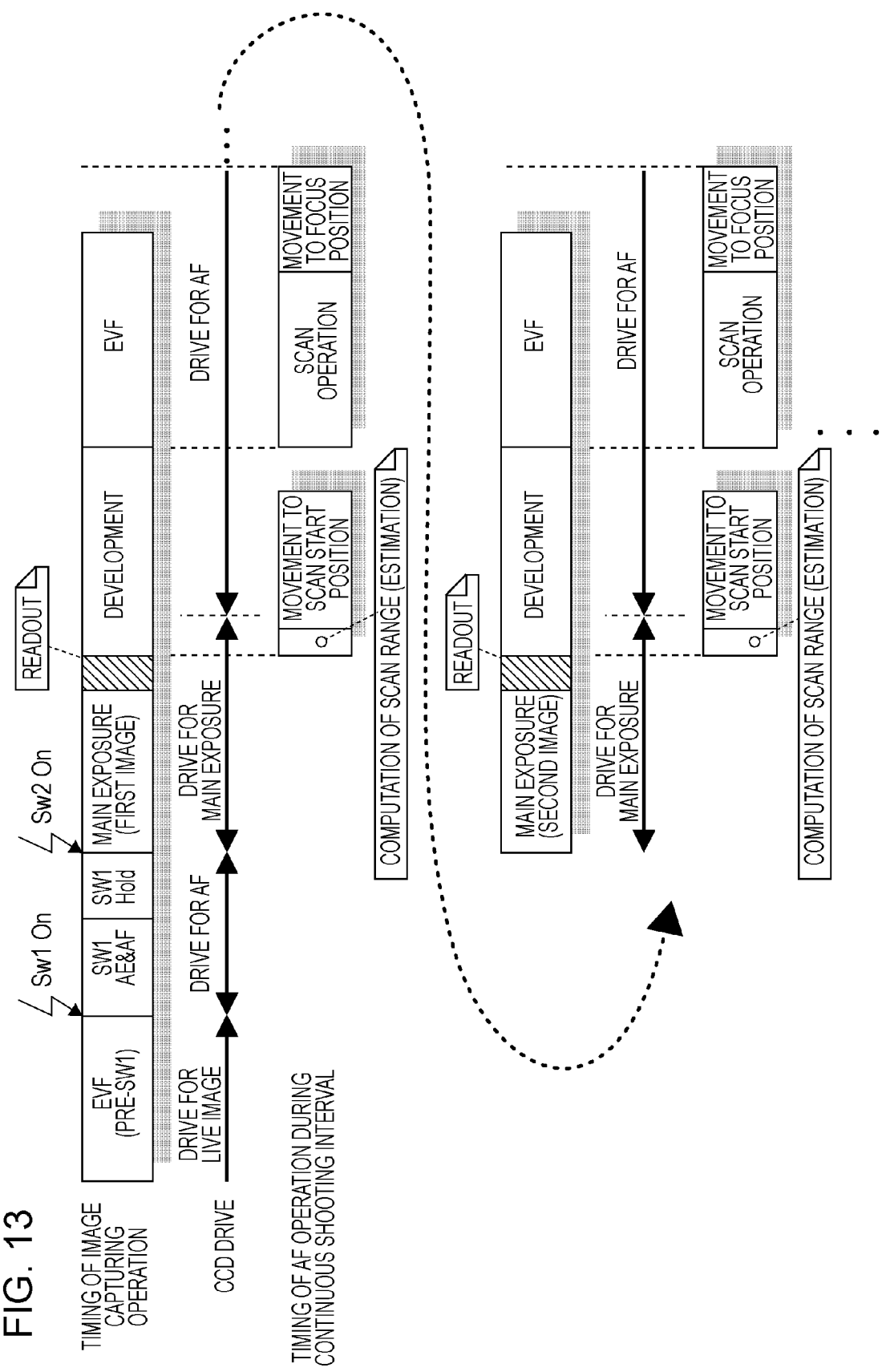
FIG. 13 is a timing diagram of an exemplary continuous shooting interval AF process according to the first exemplary embodiment.

The development process is started at step S1201 shown in FIG. 12A. The development process is started immediately after the readout operation of the main exposure image signal shown in FIG. 13 has been completed. At step S1202, it is determined whether this image capturing operation is a second image capturing operation of the continuous shooting operation. If this image capturing operation is a second image capturing operation of the continuous shooting operation (YES in step S1202), the process proceeds to step S1206. Otherwise (NO in step S1202), the process proceeds to step S1203.

At step S1206, the current position, that is, the position (FP1) of the focus lens in the first image capturing operation is determined to be at the central point of the scan range (see a position (2) in FIG. 5). The same widths of the scan range are determined so that the continuous shooting interval time is not increased, for example, the AF operation is completed within the continuous shooting interval time. Note that, in the first image capturing operation of the continuous shooting, the entire range that enables the AF in the set mode is determined to be the scan range. Additionally, the electronic camera is in an in-focus state due to the continuous AF operation. The position of the focus lens 104 is located at a peak point.

At step S1203, it is determined whether this image capturing operation is a third image capturing operation of the continuous shooting. If this image capturing operation is a third image capturing operation (YES in step S1203), the process proceeds to step S1205. Otherwise (NO in step S1203), the process proceeds to step S1204. At step S1205, the two in-focus position information items for the first image capturing operation and the second image capturing operation of the continuous shooting operation are available as in-focus position history information. Accordingly, as shown by a position (3) in FIG. 5, assuming that the continuous shooting interval time is constant, the scan middle position ObjP3 can be obtained by subject estimation using a first-order approximation as follows:

$$ObjP3 = FP2 + (FP2 - FP1) \times FpAdj3 \quad (1)$$

where
FP1: the position of the focus lens at the first shot
FP2: the position of the focus lens at the second shot FpAdj3: a parameter in the range between 0 (previous position) and 1 (estimation).

Note that the parameter FpAdj(n) is a parameter for weighting the estimation result of the subject and the immediately previous in-focus position. The value of the parameter FpAdj(n) ranges from 0 to 1. At the position of the focus lens in FIG. 5, FpAdj(n)=1. As in step S1206, the widths of the scan range are set to be the same.

At step S1204, at least three previous in-focus position information items are available as in-focus position history information. Accordingly, as shown by a position (4) in FIG. 5, assuming that the continuous shooting interval time is constant, the scan middle position ObjP4 can be obtained by subject estimation using a second-order approximation as follows:

$$ObjP4=(FP1-3 \cdot FP2+3 \cdot FP3) \times FpAdj4+FP3 \times (1-FpAdj4)$$

$$=(FP1-3 \cdot FP2+2 \cdot FP3) \times FpAdj4+FP3 \quad (2)$$

where

FP3: the position of the focus lens in the third image capturing operation.

Similarly, the scan middle position ObjP(n) in the nth image capturing operation can be obtained using a second-order approximation as follows:

$$ObjP(n)=\{FP1(n-3)-3 \cdot FP(n-2)+2 \cdot FP(n-1)\} \times FpAdj(n)+FP(n-1) \quad (3)$$

Here, as in step S1206, the widths of the scan range are determined to be the same. The process then proceeds to step S1207. At step S1207, moving of the focus lens 104 to the scan start position in the scan range determined at steps 1204 to 1206 is started. Accordingly, as shown in FIG. 13, the development process is concurrently performed while the focus lens 104 is moved.

At step S1208, it is determined whether the focus lens 104 has reached the scan start position. If the focus lens 104 has reached the scan start position (YES in step S1208), the process proceeds to step S1209. However, if the focus lens 104 has not reached the scan start position yet, the process returns to step S1208, where the system controller 115 waits for the completion of the movement of the focus lens 104. At step S1209, it is determined whether the development process has been completed. If the development process has not been completed yet (NO in step S1209), the process returns to step S1209, where the system controller 115 waits for the completion of the development process. However, if the development process has been completed (YES in step S1209), the process proceeds to step S1210. Accordingly, the process proceeds to the next processing only when the movement of the focus lens 104 and the development process have been completed.

At step S1210, the computation of the focus evaluation value is started. In addition, the display of a live image is started at step S1211. The live image that is started to be displayed again is that which was stopped being displayed immediately before the main exposure was performed at step S1100. The term "main exposure" refers to an exposure of an image to be recorded as a still image. While this main exposure is performed and the development process of data of the exposure image is performed, a live image cannot be generated. Therefore, the display of the current live image is stopped. At that time, as shown in FIG. 13, the drive of the image pickup device 108 (the CCD in FIG. 13) is changed to a drive capable of computing the focus evaluation value. The computation of the focus evaluation value ("scan operation" in FIG. 13) and the display of the live image ("EVF" in FIG. 13) are concurrently performed. That is, the focus lens 104 is moved to a predetermined position for the next image capturing before the display of the live image is resumed. Thus, the next AF operation can be rapidly performed and the continuous shooting interval time can be reduced.

Now referring to FIG. 12B, at step S1212, the focus evaluation value of the AF area set in an image capturing screen and the position of the focus lens 104 are stored in the internal calculation memory (not shown) of the system controller 115. At step S1213, the system controller 115 drives the focus lens 104 to move in a predetermined direction by a predetermined distance.

At step S1214, it is determined whether the position of the focus lens 104 corresponds to the scan end position. If the position of the focus lens 104 corresponds to the scan end position (YES in step S1214), the process proceeds to step S1215. Otherwise (NO in step S1214), the process returns to step S1212, where the scan operation continues. At step S1215, the peak point of the focus evaluation value is computed on the basis of the focus evaluation value and the position of the focus lens 104 stored at step S1212. Thus, the image capturing position is determined. At step S1216, the system controller 115 moves the focus lens 104 to the image capturing position determined at step S1215.

At step S1217, it is determined whether the focus lens 104 has reached the image capturing position. If the focus lens 104 has reached the image capturing position (YES in step S1217), the process proceeds to step S1218. Otherwise (NO in step S1217), the process returns to step S1217, where the system controller 115 waits for the arrival of the focus lens 104 at the image capturing position. At step S1218, the system controller 115 stops the computation of the focus evaluation value.

According to the first exemplary embodiment, as shown in FIG. 13, the system controller 115 can start the processes for performing the focus control operation based on the contrast detection method (i.e., the determination of the scan range, the movement to the scan start position, the scan operation, and the computation of the focus position) at appropriate timings concurrently with a series of the continuous shooting operations. Therefore, the focus control operation based on the contrast detection method can be achieved within a limited continuous shooting interval time.

In addition, start of each process is controlled so that the movement of the focus lens 104 is prevented during readout of the main exposure image signal. Accordingly, addition of noise to the main exposure image signal can be prevented, and therefore, excellent continuous shooting images can be obtained.

As used herein, the "development process" is defined as a process starting from the readout of the signal output from the A/D converter 109 to the conversion of an image format to, for example, a JPEG format. However, the following system may be employed. That is, for example, the signal output from the A/D converter 109 is subjected to white balance adjustment by the white-balance (WB) processing unit 111. Thereafter, the image processing unit 110 generates an appropriate output image signal. These two processes are defined as the "development process". Subsequently, when a live image can be generated, the display of the live image is started. In this way, the file format conversion of the output image signal to JPEG and the display of the live image can be performed concurrently.

Second Exemplary Embodiment

A second exemplary embodiment of the present invention is described next with reference to the accompanying drawings. In the second exemplary embodiment, a focus control operation can be achieved in a system in which the computation of the focus evaluation value and image processing of the main exposure image signal can be performed at the same time. Additionally, in this system, the setting of the scan range of the continuous shooting AF can be performed earlier than that in the first exemplary embodiment.

According to the second exemplary embodiment, the circuit configuration of an electronic camera is similar to that shown in FIG. 1. In addition, since the basic operation of the second exemplary embodiment is similar to that of the first exemplary embodiment shown in FIGS. 2 to 4, description thereof is not repeated. However, the image capturing operation and the focus control operation in the continuous shooting interval may be different from those of the first exemplary embodiment and are described next with reference to FIGS. 14 to 17.

Figure 14:
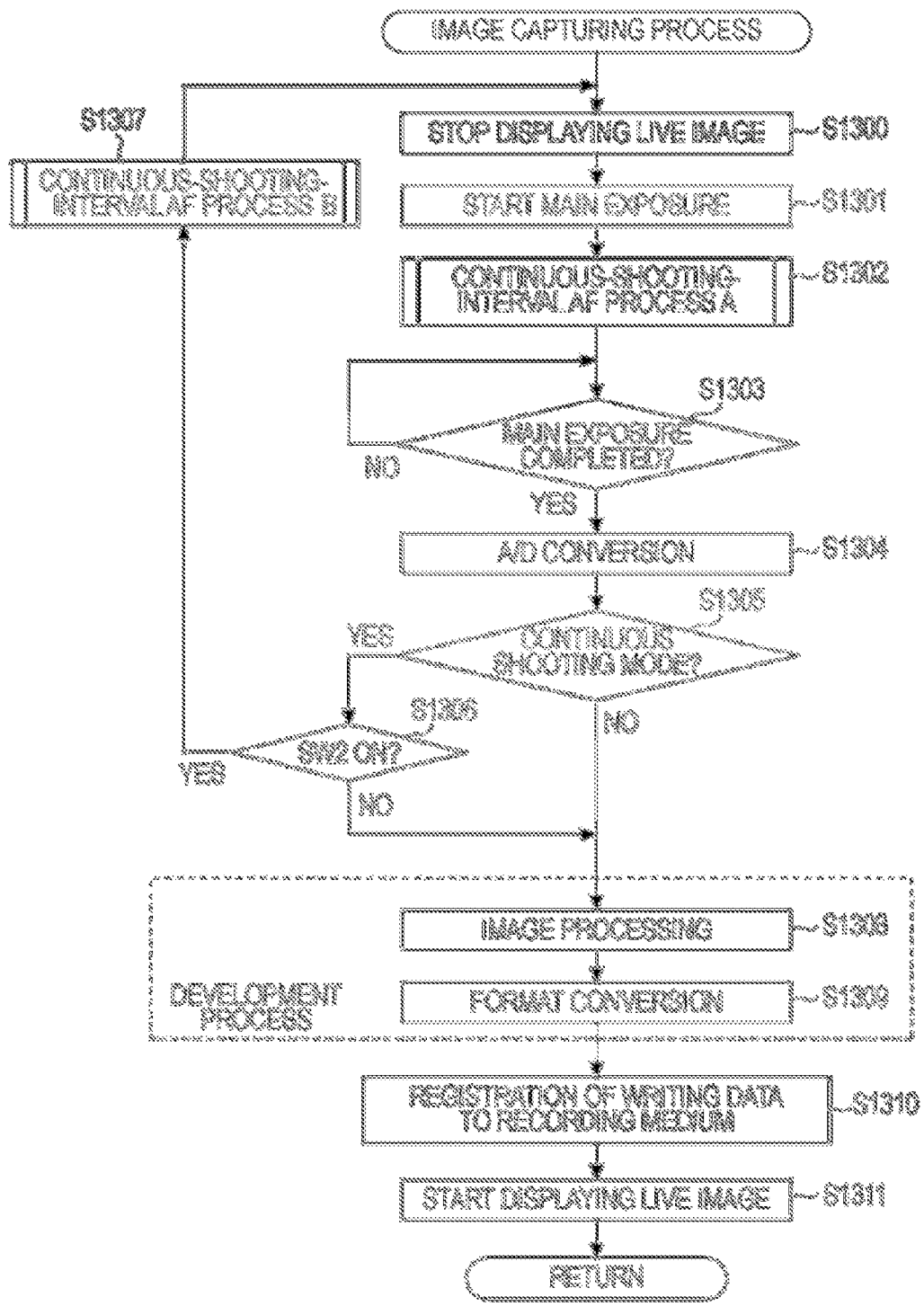
FIG. 14 is a flow chart of an exemplary image capturing process subroutine according to the second exemplary embodiment.

FIG. 14 is a flow chart of an exemplary image capturing process according to the second exemplary embodiment of the present invention. At step S1300, the display of the current live image is stopped. At step S1301, the exposure operation performed by the image pickup device 108 is started. At step S1302, a continuous shooting interval AF process A for determining a scan range is performed. This continuous shooting interval AF process A includes a subject estimation process.

The continuous shooting interval AF process A is described in detail below with reference to FIG. 15. At that time, as shown in FIG. 17, a main exposure process for capturing a still image (the main exposure shown in FIG. 17) and the continuous shooting interval AF process A (the computation of the scan range in FIG. 17) are performed concurrently.

At step S1303, it is determined whether the main exposure has been completed. If the main exposure has been completed (YES in step S1303), the process proceeds to step S1304. Otherwise (NO in step S1303), the process returns to step S1303, where the system controller 115 waits for the completion of the main exposure.

An image formed on the surface of the image pickup device 108 is photoelectrically converted to an analog signal. At step S1304, the analog signal is transferred to the A/D converter 109. The A/D converter 109 performs pre-processing including reduction of output noise of the image pickup device 108 and a non-linear process first. The A/D converter 109 then converts the analog signal to a digital signal.

At step S1305, it is determined whether the current set mode is a continuous shooting mode. If the current set mode is a continuous shooting mode (YES in step S1305), the process proceeds to step S1306. Otherwise (NO in step S1305), the process proceeds to step S1308. At step S1306, it is determined whether the switch SW2 is continuously depressed. If the ON state of the switch SW2 is maintained (YES at step S1306), the process proceeds to a continuous shooting interval B at step S1307. The continuous shooting interval B at step S1307 is described below with reference to FIGS. 16 and 17.

At step S1308, a signal output from the A/D converter 109 is subjected to white balance adjustment by the white-balance (WB) processing unit 111. The image processing unit 110 corrects this signal into an appropriate output image signal. At step S1309, the format conversion unit 112 converts the format of the output image signal to, for example, a JPEG format. The converted output image signal is temporarily stored in the DRAM 113 serving as a working memory. As used herein, the series of processes from steps S1308 to S1309 is referred to as a "development process".

At step S1310, a write request is registered. The write request is used for requesting performance of a data write process (delayed write process) in which data is written to a recording medium concurrently with another process. That is, the write request is used to instruct the image recording unit 114 to store data in the DRAM 113 serving as a working memory in a memory of the camera or on an external recording medium loaded in the camera, such as a memory card. Thus, the live image can be displayed during storing of data on the recording medium. At step S1311, the display of the live image that has been stopped at step S1311 is resumed. Then the process returns.

Thus, as can be seen from the flow chart of FIG. 14, if the continuous shooting mode is set and the switch SW2 is depressed, the continuous shooting operation is continuously performed. If one of the above-described conditions is not satisfied, a single shooting operation is performed.

Figure 15:
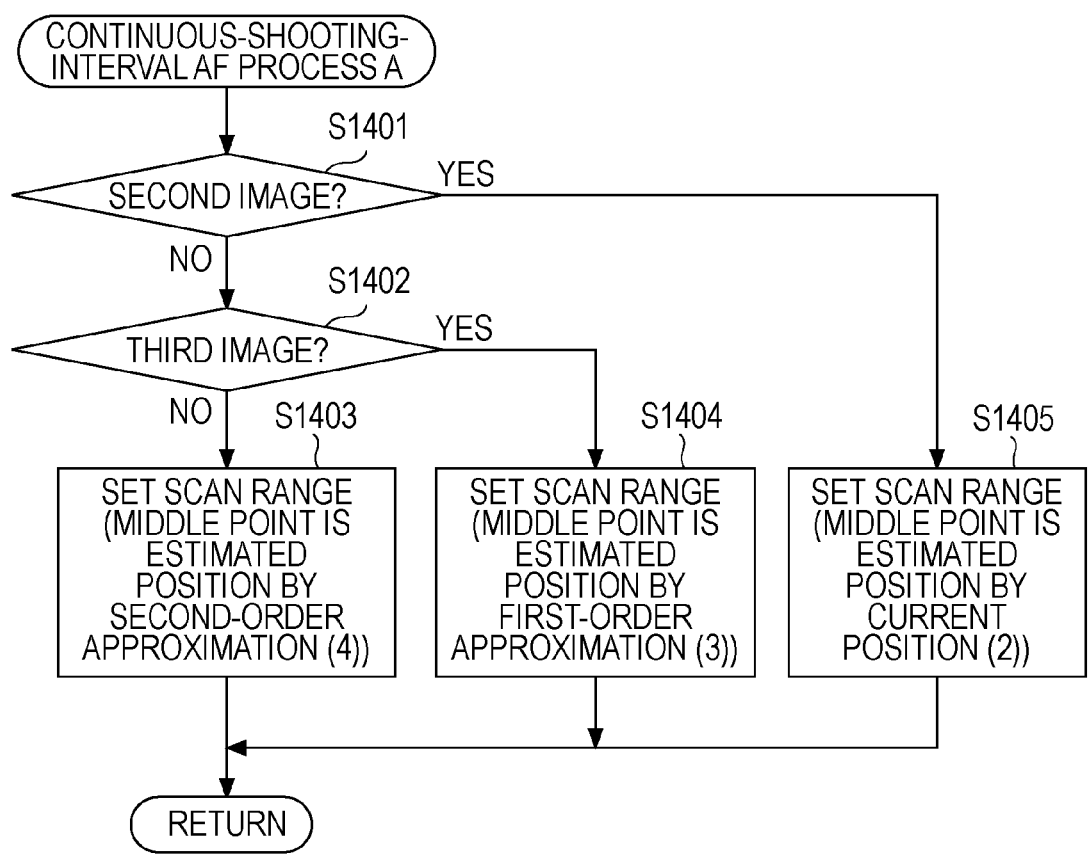
FIG. 15 is a flow chart of an exemplary continuous shooting interval AF process A according to the second exemplary embodiment.

FIG. 15 is a flow chart of an exemplary continuous shooting interval AF process A. FIG. 15 primarily illustrates a process flow for setting a scan range for the focus control during the continuous shooting interval. This focus control includes subject estimation.

At step S1401, it is determined whether this image capturing operation is a second image capturing operation of the continuous shooting operation. If this image capturing operation is a second image capturing operation (YES in step S1401), the process proceeds to step S1405. Otherwise (NO in step S1401), the process proceeds to step S1402. At step S1405, the current position, that is, the position of the focus lens 104 in the first continuous shooting operation is determined to be a central point of the scan range (see position (2) in FIG. 5). The same widths of the scan range are determined so that the continuous shooting interval time is not increased, for example, the AF operation is completed within the continuous shooting interval time.

At step S1402, it is determined whether this image capturing operation is a third image capturing operation of the continuous shooting operation. If this image capturing operation is a third image capturing operation of the continuous shooting operation (YES in step S1402), the process proceeds to step S1404. Otherwise (NO in step S1402), the process proceeds to step S1403. At step S1404, the two in-focus position information items for the first image capturing operation and the second image capturing operation of the continuous shooting operation are available as in-focus position history information. Accordingly, as shown by position (3) in FIG. 5, assuming that the continuous shooting interval time is constant, the scan middle position can be obtained by subject estimation using a first-order approximation. Note that the parameter FpAdj(n) is a parameter for weighting the estimation result of the subject and the immediately previous in-focus position. The value of the parameter FpAdj(n) ranges from 0 to 1. At the position of the focus lens in FIG. 5, FpAdj(n)=1. As in step S1405, the widths of the scan ranges are set to be the same.

At step S1403, at least three previous in-focus position information items are available as in-focus position history information. Accordingly, as shown by a position (4) in FIG. 5, assuming that the continuous shooting interval time is constant, the scan middle position can be obtained by subject estimation using a second-order approximation. As in step S1405, the widths of the scan ranges are set to be the same.

So far, the continuous shooting interval AF process A has been described. As shown in FIG. 17, this process is performed concurrently with the main exposure process. At this point of time, since the previous image capturing position has been determined, the subject estimation based on the in-focus position history information can be performed before the main exposure process is performed.

Figure 16A:
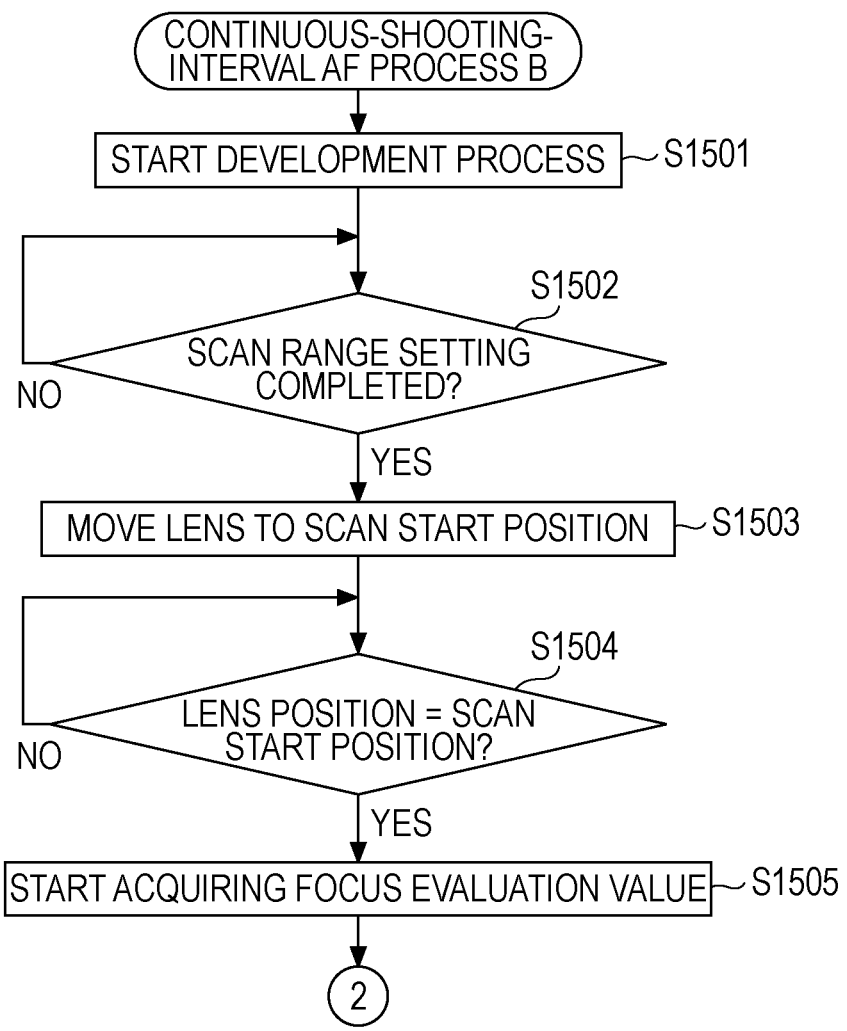

FIGS. 16A and 16B illustrate a flow chart of an exemplary continuous shooting interval AF process B. FIGS. 16A and 16B primarily illustrate operations subsequent to the scan operation for focus control.

The development process is started at step S1501. The development process is started immediately after the readout operation of the main exposure image signal shown in FIG. 17 has been completed. At step S1502, it is determined whether the previous scan range setting operation has been completed. If the previous scan range setting operation has been completed (YES in step S1502), the process proceeds to step S1503. Otherwise (NO in step S1502), the process returns to step S1502, where the system controller 115 waits for the completion of the previous scan range setting operation. At step S1503, moving of the focus lens 104 to the scan start position in the determined scan range is started. Accordingly, as shown in FIG. 17, the development process is concurrently performed during the movement of the focus lens 104.

At step S1504, it is determined whether the focus lens 104 has reached the scan start position. If the focus lens 104 has reached the scan start position (YES in step S1504), the process proceeds to step S1505. However, if the focus lens 104 has not reached the scan start position yet (NO in step S1504), the process stays at step S1504, where the system controller 115 waits for the completion of the movement of the focus lens 104. At step S1505, the computation of the focus evaluation value is started. At that time, as shown in FIG. 17, the drive of the image pickup device 108 (the CCD in FIG. 13) is changed to the drive capable of computing the focus evaluation value. The computation of the focus evaluation value ("scan operation" in FIG. 17) and the development process ("development" in FIG. 17) are concurrently performed.

Now referring to FIG. 16B, at step S1506, the focus evaluation value of the AF area set in the image capturing screen and the position of the focus lens 104 are stored in the internal calculation memory (not shown) of the system controller 115. At step S1507, the system controller 115 drives the focus lens 104 to move in a predetermined direction by a predetermined distance. At step S1508, it is determined whether the position of the focus lens 104 corresponds to the scan end position. If the position of the focus lens 104 corresponds to the scan end position (YES in step S1508), the process proceeds to step S1509. Otherwise (NO in step S1508), the process returns to step S1506, where the scan operation continues.

At step S1509, the peak point of the focus evaluation value is computed on the basis of the focus evaluation value and the position of the focus lens 104 stored at step S1506. Thus, the image capturing position is determined. At step S1510, the system controller 115 moves the focus lens 104 to the image capturing position determined at step S1509. At step S1511, the system controller 115 stops the computation of the focus evaluation value.

At step S1512, it is determined whether the focus lens 104 has reached the image capturing position. If the focus lens 104 has reached the image capturing position (YES in step S1512), the process is completed. Otherwise (NO in step S1512), the process returns to step S1512, where the system controller 115 waits for the arrival of the focus lens 104 at the image capturing position.

According to the second exemplary embodiment, as shown in FIG. 17, the system controller 115 can start the processes for performing the focus control operation based on the contrast detection method (i.e., the determination of the scan range, the movement to the scan start position, the scan operation, and the computation of the focus position) at appropriate timings concurrently with a series of the continuous shooting operations including the main exposure for capturing a still image. Therefore, the focus control operation based on the contrast detection method can be achieved within a limited continuous shooting interval time.

In addition, start of each process is controlled so that the movement of the focus lens 104 is prevented during readout of the main exposure image signal. Accordingly, addition of noise to the main exposure image signal can be prevented, and therefore, excellent continuous shooting images can be obtained.

Third Exemplary Embodiment

A third exemplary embodiment of the present invention is described next with reference to the accompanying drawings. According to the third exemplary embodiment, the system configuration is similar to that of the second exemplary embodiment. In addition, in this configuration, when an actuator operates, noise does not have a negative impact on the main exposure image signal. For example, an actuator for driving the focus lens 104 is disposed distant from the image pickup device 108 and the A/D converter 109.

Figure 18:
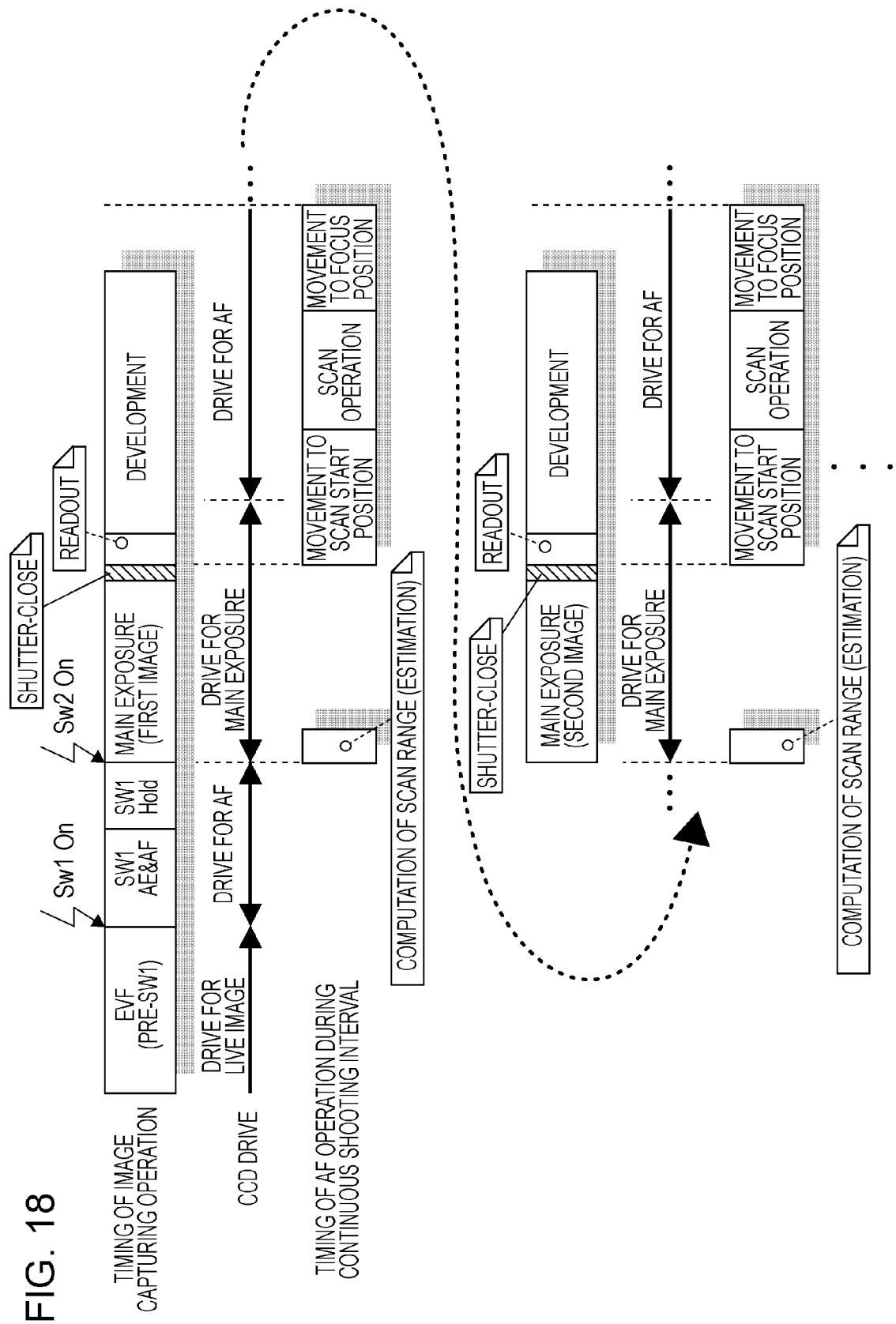
FIG. 18 is an exemplary timing diagram of the continuous shooting interval AF process according to the third exemplary embodiment.

In such a configuration, since noise caused by the operation of the actuator needs not to be taken into account when the main exposure image signal is read out, the focus lens 104 can be moved immediately after the shutter is closed, as shown in FIG. 18. Accordingly, the continuous shooting interval AF process can be efficiently performed.

According to the first to third exemplary embodiments of the present invention, the following advantages can be provided.

(1) Moving of the focus lens 104 to the scan start position is started after the main exposure image is read out. Thereafter, when the focus lens 104 reaches the scan start position after an image signal for computation of the focus evaluation value is started to be read out, the scan operation is started. Accordingly, the development process (a variety of image processing and JPEG compression) for recording a still image after the main exposure is performed can be performed concurrently with the focus control. Consequently, the focus control operation based on the contrast detection method can be completed within the limited continuous shooting interval time. In addition, as noted above, the moving of the focus lens 104 to the scan start position is performed after the main exposure image has been read out. Thus, noise caused by the operation of the focus lens 104 does not have a negative impact on the main exposure image signal, and therefore, excellent images can be obtained by continuous shooting.

(2) It is assumed that the hardware configuration is employed in which noise caused by the operation of the focus lens 104 does not have a negative impact on the main exposure image signal. In such a case, the focus lens 104 is moved to the scan start position after the shutter blocks light for the main exposure. After readout of an image signal for computation of the focus evaluation value is started and the focus lens 104 reaches the scan start position, the scan operation is started. Accordingly, after the main exposure is performed, the development process (a variety of image processing and JPEG compression) for recording a still image can be performed concurrently with the focus control. Consequently, the focus control operation based on the contrast detection method can be completed within the limited continuous shooting interval time.

(3) The focus lens 104 is moved to the scan start position after the readout of the main exposure image has been completed. Thereafter, when the focus lens 104 reaches the scan start position after the development process has been completed, the scan operation is started. Accordingly, the start timing of the scan operation can be controlled so as to avoid a variety of constrained cases. Examples of the constrained case include a) a case where the following concurrent operations are difficult: a high-load process for the system, such as the development process (a variety of image processing and JPEG compression) for recording a still image after the main exposure is performed, and the focus evaluation value acquirement operation by the contrast detection method that requires the signal processing; and b) a case where the following concurrent operations are difficult due to the hardware resource conflict: the development process and the focus evaluation value acquirement operation that require the same resource. Consequently, by taking into account the system load and the hardware resource conflict, the focus control operation based on the contrast detection method can be completed within the limited continuous shooting interval time. Thus, noise caused by the operation of the focus lens 104 does not have a negative impact on the main exposure image signal, and therefore, excellent images can be obtained by continuous shooting.

(4) It is assumed that the hardware configuration is employed in which noise caused by the operation of the focus lens 104 does not have a negative impact on the main exposure image signal. In such a case, the focus lens 104 is moved to the scan start position after the shutter blocks light for the main exposure. After readout of an image signal for computation of the focus evaluation value is started and the focus lens 104 reaches the scan start position, the scan operation is started. Accordingly, the start timing of the scan operation can be controlled so as to avoid a variety of constrained cases. Examples of the constrained case include a) a case where the following concurrent operations are difficult: a high-load process for the system, such as the development process (a variety of image processing and JPEG compression) for recording a still image after the main exposure is performed, and the focus evaluation value acquirement operation by the contrast detection method that requires the signal processing; and b) a case where the following concurrent operations are difficult due to the hardware resource conflict: the development process and the focus evaluation value acquirement operation that require the same resource. Consequently, by taking into account the system load and the hardware resource conflict, the focus control operation based on the contrast detection method can be completed within the limited continuous shooting interval time.

(5) When the scan range setting process of computing the central point and the width of the scan range on the basis of a history of the positions of the focus lens 104 in the previous image capturing operations is performed, a variety of approximation calculations are required to estimate the movement of a subject. In addition, a certain time may be required until the scan range setting process is completed. However, according to the present invention, the scan range computation process can be completed between the time the image capturing position for the previous image is determined and the time the moving of the focus lens to the scan start position is started for the next scan operation. Accordingly, for example, the scan range setting process for the next image to be captured can be performed in advance while the focus lens 104 moves to the image capturing position or the main exposure is performed. Consequently, the focus control operation based on the contrast detection method can be efficiently performed within the limited continuous shooting interval time.

(6) During the computation of the focus evaluation value, a live image can be generated and displayed on the basis of image signals periodically output from the image pickup device 108. That is, in the focus control operation based on the contrast detection method, a subject image is captured by the image pickup device 108 at a predetermined interval and the focus evaluation value is computed on the basis of the signals of the subject image. At that time, the image signal output from the image pickup device 108 is used not only for the computation of the focus evaluation value, but also for the display of the live image. Consequently, the live image can be displayed in the continuous shooting interval time, and therefore, a photographer can easily recognize the change in the subject during the continuous shooting interval time.

As can be seen from the foregoing description, according to the first to third exemplary embodiments of the present invention, the electronic camera can start the processes for performing the focus control operation based on the contrast detection method at appropriate timings concurrently with a series of the continuous shooting operations. Consequently, the focus control operation based on the contrast detection method can be efficiently performed within the limited continuous shooting interval time. In addition, the electronic camera controls start of each process so that the movement of the focus lens 104 is prevented during the main exposure and readout of the main exposure image signal. Thus, blur of a recorded image and addition of noise to the main exposure image signal can be prevented, and therefore, excellent images can be obtained by continuous shooting.

That is, the focus control during the continuous shooting interval can be achieved and excellent images can be obtained by continuous shooting. Accordingly, unlike existing electronic cameras, a cost-effective electronic camera having a compact size and that does not waste the capacity of a recording medium can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-042449 filed Feb. 20, 2006, which is hereby incorporated by reference herein in its entirety.

What is claimed:

1. An image pickup apparatus having a continuous shooting mode in which a plurality of images are captured for recording in response to an image capture instruction, the image pickup apparatus comprising:

a detection unit configured to perform a detection operation to detect a focal point for an object in accordance with a captured image while moving a focus lens in a light axis direction of the focus lens; and a control unit configured to control movement of the focus lens and to control capturing of an image, including capturing first image data of a first image and capturing a second image data of a second image which is continuous of the first image, wherein the control unit is configured to control movement of the focus lens so that the focus lens is focused at the focal point detected by the detection unit, wherein, in the continuous shooting mode and after the control unit controls the movement of the focus lens using the focal point detected by the detection unit and captures the first image data for recording in the continuous shooting mode, the control unit controls the movement of the focus lens before capturing the second image data for recording in the continuous shooting mode, and wherein (i) applying image development processing to the captured first image data to generate processed first image data and (ii) moving the focus lens via the control unit as part of a detection operation by the detection unit to detect a focal point for an object in accordance with the captured first data image to be used in capturing the second image data are performed concurrently.

2. The image pickup apparatus according to claim 1, wherein control of the movement of the focus lens for capturing the second image data and a readout process of an exposure image from an image pickup device are performed concurrently.

3. The image pickup apparatus according to claim 1, wherein control of the movement of the focus lens for capturing the second image data includes controlling movement of the focus lens so that the focus lens is at a scan start position utilized to detect the focal point.

4. The image pickup apparatus according to claim 1, wherein, in the continuous shooting mode, a position from which the detection unit performs detection of a focal point for use in capturing the second image data is determined based on a position of a focal point detected during capturing of the first image data.

5. The image pickup apparatus according to claim 1, further comprising:
   a continuous auto focus (AF) mode unit having a single AF mode in which a subject is focused on in one scanning operation immediately before a shooting operation and a continuous AF mode in which a subject is focused on before and during a shooting operation; and
   a determination unit configured to determine whether an AF mode of the continuous AF mode unit is the single AF mode or the continuous AF mode and to determine a scan range of the detection unit to perform a detection operation to detect a focusing state by acquiring a focus evaluation value,
   wherein, in response to the determination unit determining that the AF mode is the single AF mode, the determination unit determines the scan range of the detection unit to be an entire AF available area, and
   wherein, in response to the determination unit determining that the AF mode is the continuous AF mode, the determination unit determines the scan range of the detection unit to be less than the entire AF available area so that a focus control operation based on a contrast detection method can be achieved within a limited continuous shooting interval time.

6. The image pickup apparatus according to claim 5, wherein a scan range less than the entire AF available area is a scan range having a predetermined narrow scan width at a center of which is a current focus lens position.

7. The image pickup apparatus according to claim 1, wherein image development processing of the captured first image data includes at least one of white balance adjustment and format conversion.

8. The image pickup apparatus according to claim 7, wherein image development processing of the captured first image data is a process starting from a readout of a signal output from an analogue/digital converter to conversion of an image format of the captured first image data.

9. The image pickup apparatus according to claim 1, further comprising a determining unit configured to determine a scan range to be used as part of capturing an image,
   wherein the determining unit determines a scan range, to be used as part of capturing the second image data, having a scan width that is equal to a scan width of a scan range used as part of capturing the first image data such that a time interval between image capturing operations in the continuous shooting mode does not increase.

10. The image pickup apparatus according to claim 1, wherein (i) applying image development processing to the captured first image data and (ii) moving the focus lens as part of a detection operation to detect a focal point are performed concurrently in part at least.

11. The image pickup apparatus according to claim 1, wherein the detection operation to detect a focal point is a scan operation.

12. An image pickup apparatus having a continuous shooting mode in which a plurality of images are captured for recording in response to an image capture instruction, the image pickup apparatus comprising:
   a detection unit configured to perform a detection operation to detect a focal point for an object in accordance with a captured image while moving a focus lens in a light axis direction of the focus lens;
   a memory configured to temporarily store captured images;
   an instructing unit configured to instruct a monitor to output the plurality of images without recording the captured images stored in the memory; and
   a control unit configured to control movement of the focus lens and to control capturing of an image, including capturing first image data of a first image and capturing a second image data of a second image which is continuous of the first image, wherein the control unit is configured to control movement of the focus lens so that the focus lens is focused at the focal point detected by the detection unit,
   wherein, in the continuous shooting mode and after the control unit controls the movement of the focus lens using the focal point detected by the detection unit and captures the first image data for recording in the continuous shooting mode, the control unit controls the movement of the focus lens before the instruction unit instructs the monitor to output one image of the plurality of images, and
   wherein (i) applying image development processing to the captured first image data to generate processed first image data and (ii) moving the focus lens via the control unit as part of a detection operation by the detection unit to detect a focal point for an object in accordance with the captured first data image to be used in capturing the second image data are performed concurrently.

13. The image pickup apparatus according to claim 12, wherein, in the continuous shooting mode, a position from which the detection unit performs detection of a focal point for use in capturing the second image data is determined based on a position of a focal point detected during capturing of the first image data.

14. The image pickup apparatus according to claim 12, further comprising:
   a continuous auto focus (AF) mode unit having a single AF mode in which a subject is focused on in one scanning operation immediately before a shooting operation and a continuous AF mode in which a subject is focused on before and during a shooting operation; and
   a determination unit configured to determine whether an AF mode of the continuous AF mode unit is the single AF mode or the continuous AF mode and to determine a scan range of the detection unit to detect a focusing state by acquiring a focus evaluation value,
   wherein, in response to the determination unit determining that the AF mode is the single AF mode, the determination unit determines the scan range of the detection unit to be an entire AF available area, and wherein, in response to the determination unit determining that the AF mode is the continuous AF mode, the determination unit determines the scan range of the detection unit to be less than the entire AF available area so that a focus control operation based on a contrast detection method can be achieved within a limited continuous shooting interval time.

15. The image pickup apparatus according to claim 14, wherein a scan range less than the entire AF available area is a scan range having a predetermined narrow scan width at a center of which is a current focus lens position.

16. The image pickup apparatus according to claim 12, wherein (i) applying image development processing to the captured first image data and (ii) moving the focus lens as part of a detection operation to detect a focal point are performed concurrently in part at least.

17. The image pickup apparatus according to claim 12, wherein the detection operation to detect a focal point is a scan operation.

18. A method utilized in an image pickup apparatus having a continuous shooting mode in which a plurality of images are captured for recording in response to an image capture instruction, the method comprising:
   performing a detection operation to detect a focal point for an object in accordance with a captured image while moving a focus lens in a light axis direction of the focus lens; and
   controlling movement of the focus lens and controlling capturing of an image, including capturing first image data of a first image and capturing a second image data of a second image which is continuous of the first image, wherein controlling movement includes controlling movement of the focus lens so that the focus lens is focused at the detected focal point,
   wherein, in the continuous shooting mode and after controlling movement of the focus lens using the detected focal point and capturing the first image data for recording in the continuous shooting mode, controlling movement includes controlling the movement of the focus lens before capturing the second image data for recording in the continuous shooting mode, and
   wherein (i) applying image development processing to the captured first image data to generate processed first image data and (ii) moving the focus lens as part of a detection operation to detect a focal point for an object in accordance with the captured first data image to be used in capturing the second image data are performed concurrently.

19. A method to be utilized in an image pickup apparatus having a continuous shooting mode in which a plurality of images are captured for recording in response to an image capture instruction, the method comprising:
   performing a detection operation to detect a focal point for an object in accordance with a captured image while moving a focus lens in a light axis direction of the focus lens; temporarily storing captured images in a memory; instructing a monitor to output the plurality of images without recording the captured images stored in the memory; and
   controlling movement of the focus lens and controlling capturing of an image, including capturing first image data of a first image and capturing a second image data of a second image which is continuous of the first image, wherein controlling movement includes controlling movement of the focus lens so that the focus lens is focused at the detected focal point,
   wherein, in the continuous shooting mode and after controlling movement of the focus lens using the detected focal point and capturing the first image data for recording in the continuous shooting mode, controlling movement includes controlling the movement of the focus lens before instructing the monitor to output one image of the plurality of images, and
   wherein (i) applying image development processing to the captured first image data to generate processed first image data and (ii) moving the focus lens as part of a detection operation to detect a focal point for an object in accordance with the captured first data image to be used in capturing the second image data are performed concurrently.

20. A non-transitory computer readable medium storing a program that causes an image pickup apparatus to perform the method according to claim 18.

21. A non-transitory computer readable medium storing a program that causes an image pickup apparatus to perform the method according to claim 19.

* * * * *